(12) United States Patent
Yoon et al.

(10) Patent No.: US 12,476,328 B2
(45) Date of Patent: Nov. 18, 2025

(54) BATTERY PACK

(71) Applicant: Samsung SDI Co., Ltd., Yongin-si (KR)

(72) Inventors: Seokbin Yoon, Yongin-si (KR); Daeyon Moon, Yongin-si (KR); Kwangsoo Bae, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 463 days.

(21) Appl. No.: 18/149,966

(22) Filed: Jan. 4, 2023

(65) Prior Publication Data
US 2023/0216147 A1 Jul. 6, 2023

(30) Foreign Application Priority Data
Jan. 5, 2022 (KR) .......................... 10-2022-0001635

(51) Int. Cl.
*H01M 50/503* (2021.01)
*H01M 10/48* (2006.01)
(Continued)

(52) U.S. Cl.
CPC ....... *H01M 50/503* (2021.01); *H01M 10/482* (2013.01); *H01M 10/486* (2013.01);
(Continued)

(58) Field of Classification Search
CPC ............. H01M 50/503; H01M 50/509; H01M 50/291; H01M 50/213; H01M 50/271; H01M 10/482; H01M 10/486
See application file for complete search history.

(56) References Cited

U.S. PATENT DOCUMENTS

2014/0255750 A1* 9/2014 Jan ...................... H01M 50/213
429/158
2015/0255225 A1 9/2015 Kusaba et al.
(Continued)

FOREIGN PATENT DOCUMENTS

CN 115395120 A 11/2022
CN 115395159 A 11/2022
(Continued)

OTHER PUBLICATIONS

Extended European Search Report issued in corresponding EP Application No. 23150514.0, dated Apr. 7, 2023, 6 pages.
(Continued)

*Primary Examiner* — Milton I Cano
(74) *Attorney, Agent, or Firm* — Womble Bond Dickinson (US) LLP

(57) ABSTRACT

A battery pack includes: a plurality of battery cells arranged into rows adjacent to each other, adjacent rows of battery cells being alternately shifted to front positions or rear positions in a row direction; busbars arranged to form a parallel group of battery cells by connecting a group of battery cells to each other in parallel, and connecting adjacent parallel groups to each other in series, the busbars including a body portion extending in a zigzag shape in a column direction and a first and second branch portion extending in the row direction from the body portion toward different parallel groups; and expansion pieces protruding from the body portion of the busbar to external positions outside the plurality of battery cells in the row direction or the column direction.

20 Claims, 20 Drawing Sheets

(51) Int. Cl.
    *H01M 50/213* (2021.01)
    *H01M 50/271* (2021.01)
    *H01M 50/291* (2021.01)
    *H01M 50/509* (2021.01)
(52) U.S. Cl.
    CPC ....... *H01M 50/213* (2021.01); *H01M 50/271* (2021.01); *H01M 50/291* (2021.01); *H01M 50/509* (2021.01)

(56) References Cited

U.S. PATENT DOCUMENTS

| | | | |
|---|---|---|---|
| 2015/0325824 A1 | 11/2015 | Hasegawa et al. | |
| 2016/0093853 A1* | 3/2016 | Nakamura | H01M 50/213 |
| | | | 429/156 |
| 2019/0214694 A1 | 7/2019 | Yang et al. | |
| 2019/0252740 A1 | 8/2019 | Yang | |
| 2019/0372069 A1 | 12/2019 | Lee et al. | |
| 2020/0044097 A1* | 2/2020 | Kaempfe | H10D 48/021 |
| 2020/0112008 A1* | 4/2020 | Kwag | H01M 10/613 |
| 2021/0028502 A1* | 1/2021 | Seol | H01M 10/613 |
| 2021/0036300 A1* | 2/2021 | Bae | H01M 50/50 |
| 2021/0050635 A1* | 2/2021 | Lee | H01M 10/6554 |
| 2021/0091350 A1 | 3/2021 | Yoon et al. | |
| 2021/0167342 A1* | 6/2021 | Kwag | H01M 10/613 |
| 2021/0203029 A1 | 7/2021 | Ahn | |
| 2021/0384569 A1 | 12/2021 | Lee et al. | |
| 2022/0209367 A1* | 6/2022 | Bae | H01M 50/503 |
| 2022/0376319 A1* | 11/2022 | Yoon | H01M 50/213 |
| 2022/0376339 A1* | 11/2022 | Yoon | H01M 50/262 |
| 2022/0399578 A1 | 12/2022 | Lee et al. | |
| 2023/0216147 A1 | 7/2023 | Yoon et al. | |
| 2023/0238631 A1 | 7/2023 | Kwag | |

FOREIGN PATENT DOCUMENTS

| | | | |
|---|---|---|---|
| CN | 219677493 U | | 9/2023 |
| EP | 2 913 864 A1 | | 9/2015 |
| EP | 3 748 722 A1 | | 12/2020 |
| EP | 4 095 998 A1 | | 11/2022 |
| EP | 4 095 999 A1 | | 11/2022 |
| GB | 2590615 | * | 7/2021 |
| KR | 10-2016-0127980 A | | 11/2016 |
| KR | 10-1720636 B1 | | 3/2017 |
| KR | 10-2017-0099589 A | | 9/2017 |
| KR | 10-2019-0032887 A | | 3/2019 |
| KR | 10-2019-0053106 A | | 5/2019 |
| KR | 10-2020-0012189 A | | 2/2020 |
| KR | 10-2021-0030070 A | | 3/2021 |
| KR | 10-2249509 B1 | | 5/2021 |
| KR | 10-2021-0078139 A | | 6/2021 |
| KR | 10-2260973 B1 | | 6/2021 |
| KR | 10-2021-0086091 A | | 7/2021 |
| KR | 10-2021-0151469 A | | 12/2021 |
| WO | WO 2014/119287 A1 | | 8/2014 |

OTHER PUBLICATIONS

Korean Office Action issued in corresponding KR Application No. KR 10-2022-0001635, dated Mar. 3, 2025, 6 pages.
Chinese Office Action issued in corresponding Chinese Application No. 202310013146.9, dated Jul. 23, 2025, 7 pages.
Korean Notice of Allowance issued in corresponding KR Application No. 10-2022-0001635, dated Jun. 11, 2025, 3 pages.

* cited by examiner

BATTERY PACK

CROSS-REFERENCE TO RELATED APPLICATION

This application claims priority to and the benefit of Korean Patent Application No. 10-2022-0001635, filed on Jan. 5, 2022, in the Korean Intellectual Property Office, the entire disclosure of which is incorporated herein by reference.

BACKGROUND

1. Field

Aspects of embodiments of the present disclosure relate to a battery pack.

2. Description of the Related Art

Generally, secondary batteries are designed to be rechargeable, different from non-rechargeable primary batteries. Secondary batteries are used as energy sources of devices, such as mobile devices, electric vehicles, hybrid vehicles, electric bicycles, or uninterruptible power supplies, and depending on the type of an external device using the secondary battery, the secondary battery may be used as a single battery cell or as a battery pack in which a plurality of battery cells are connected to each other to constitute a unit.

A small mobile device, such as a mobile phone, may operate for a certain time period with the output and capacity of a single battery. However, a mobile device having a relatively large size, such as a notebook computer, an electric vehicle consuming a relatively large amount of power, or a device requiring an operation of a relatively long duration and high power, such as a hybrid vehicle, a battery in the form of a package including a plurality of batteries is used to enable sufficient output and capacity, and an output voltage or an output current may be determine based on the number of batteries included therein and their connection structure.

SUMMARY

According to embodiments of the present disclosure, a module having various outputs and capacities may be provided including a plurality of battery packs, each of which is one unit having the same (or substantially the same) structure, that are connected to each other. By increasing or decreasing the number of battery packs included in the module, battery modules may adaptively designed and/or configured to respond to various outputs and capacities by using battery packs having the same structure.

According to other embodiments of the present disclosure, a battery pack having an improved structure is provided such that various temperature detection positions (or temperature detection locations) may naturally be set for a module expanded to include a plurality of battery packs, including the central position of the entire module, through temperature detection positions set for each battery pack without requiring separately setting temperature detection positions in the expanded module.

Additional aspects and features of the present disclosure will be set forth, in part, in the description which follows and, in part, will be apparent from the description or may be learned by practice of the embodiments described herein.

According to an embodiment of the present disclosure, a battery pack includes a plurality of battery cells arranged in a plurality of rows in a row direction, the rows of battery cells being adjacent to each other in a column direction crossing the row direction, the battery cells being alternately shifted to front positions or rear positions in the row direction, busbars electrically connecting the plurality of battery cells to each other, arranged to form a parallel group by connecting an group of adjacent battery cells to each other in parallel, and connects adjacent parallel groups to each other in series, each of the busbars including a body portion extending between parallel groups adjacent to each other and in a zigzag shape in the column direction, and a first branch portion and a second branch portion, both extending in the row direction from the body portion toward different adjacent parallel groups, respectively, and expansion pieces protruding from the body portion of the busbar to external positions outside the plurality of battery cells in the row direction or the column direction.

The first and second branch portions may extend parallel to each other from positions alternating with each other in the body portion of the busbar in the row directions opposite to each other.

The first and second branch portions may extend parallel to each other in the row direction at positions alternating with each other in the column direction to be fitted into each other in each parallel group.

The first and second branch portions may be fitted into each other while protruding toward respective parallel groups from the body portions of the different busbars arranged on both sides of each parallel group.

The expansion pieces may include first expansion pieces protruding in the row direction from the body portion of an outermost busbar in the row direction.

The body portion of any one of a foremost busbar and a rearmost busbar, which face each other in the row direction, may form a first expansion edge in which the first expansion pieces are formed, and the body portion of the other busbar may form a first accommodation edge that accommodates the first expansion pieces.

The body portion of the busbar that forms the first expansion edge may have concave portions in which the first expansion pieces are formed, the body portion of the busbar that forms the first accommodation edge may have convex portions that accommodate the first expansion pieces, and the concave portions in which the first expansion pieces are formed, and the convex portions that accommodate the first expansion pieces may be formed at positions facing each other in the row direction.

The body portion of the busbar that forms the first expansion edge may have convex portions alternately arranged with the concave portions and may extend in a first zigzag shape, and the body portion of the busbar that forms the first accommodation edge may have concave portions alternately arranged with the convex portions and may extend in a second zigzag shape.

The first and second zigzag shapes may be formed in complementary shapes such that the concave portions and the convex portions of the body portion of the busbar that forms the first expansion edge, and the convex portions and the concave portions of the body portion of the busbar that forms the first accommodation edge face each other in the row direction, respectively.

The battery pack may further include a cell holder having front walls and rear walls facing each other in the row direction to accommodate the plurality of battery cells, any one walls of the front walls and the rear walls may form a first expansion edge together with the body portion of the busbar in which the first expansion pieces are formed, and the other one of the front walls and the rear walls may form a first accommodation edge together with the body portion of the busbar that accommodates the first expansion pieces.

The walls that form the first expansion edge may extend in a first zigzag shape by following the body portion of the busbar that forms the first expansion edge, and the walls that form the first accommodation edge may extend in a second zigzag shape by following the body portion of the busbar that forms the first accommodation edge.

The first and second zigzag shapes may be formed in complementary shapes such that the concave portions and the convex portions of the walls that form the first expansion edge and the convex portions and the concave portions of the wall that form the first accommodation edge face each other, respectively, in the row direction.

The expansion pieces may include second expansion pieces protruding in the column direction from outermost positions of the body portions of the busbars in the column direction.

From among positions of one end and another end of the body portions of the busbars in the column direction, outermost positions of any one end may form a second expansion edge in which the second expansion pieces are formed, and outermost positions of the other end may form a second accommodation edge that accommodates the second expansion pieces.

The battery pack may further include a cell holder having a first sidewall and a second sidewall facing each other in the column direction to accommodate the plurality of battery cells, any one sidewall of the first sidewall and the second sidewall may form the second expansion edge together with the outermost positions of the body portions of the busbars in which the second expansion pieces are formed, and the other sidewall may form the second accommodation edge together with the outermost positions of the body portions of the busbars that accommodate the second expansion pieces.

The sidewall that forms the second expansion edge and the sidewall that forms the second accommodation edge may be flat and may contact each other.

The battery pack may further include a cell holder that extends around an accommodation space for the plurality of battery cells and may have a hollow protrusion formed at a temperature detection position, a cover arranged on the cell holder and having an exposure hole for exposing the hollow protrusion, and a thermistor accommodated in the hollow protrusion through the exposure hole for measuring a temperature of the battery cells.

The temperature detection position may include a first temperature detection position at a central position of the cell holder and a second temperature detection position nearer to a corner position of the cell holder than to a central position of the cell holder is.

The second temperature detection position may include four second temperature detection positions formed adjacent to four corner positions that are at where a second expansion edge and a second accommodation edge facing each other in the row direction and a first expansion edge and a first accommodation edge facing each other in the column direction contact each other.

The second temperature detection positions may be formed at positions between the first expansion edge and the first accommodation edge and may be positionally biased toward the first accommodation edge.

BRIEF DESCRIPTION OF THE DRAWINGS

The above and other aspects and features of the present disclosure will be more apparent from the following description taken in conjunction with the accompanying drawings, in which.

DETAILED DESCRIPTION

Figure 1:
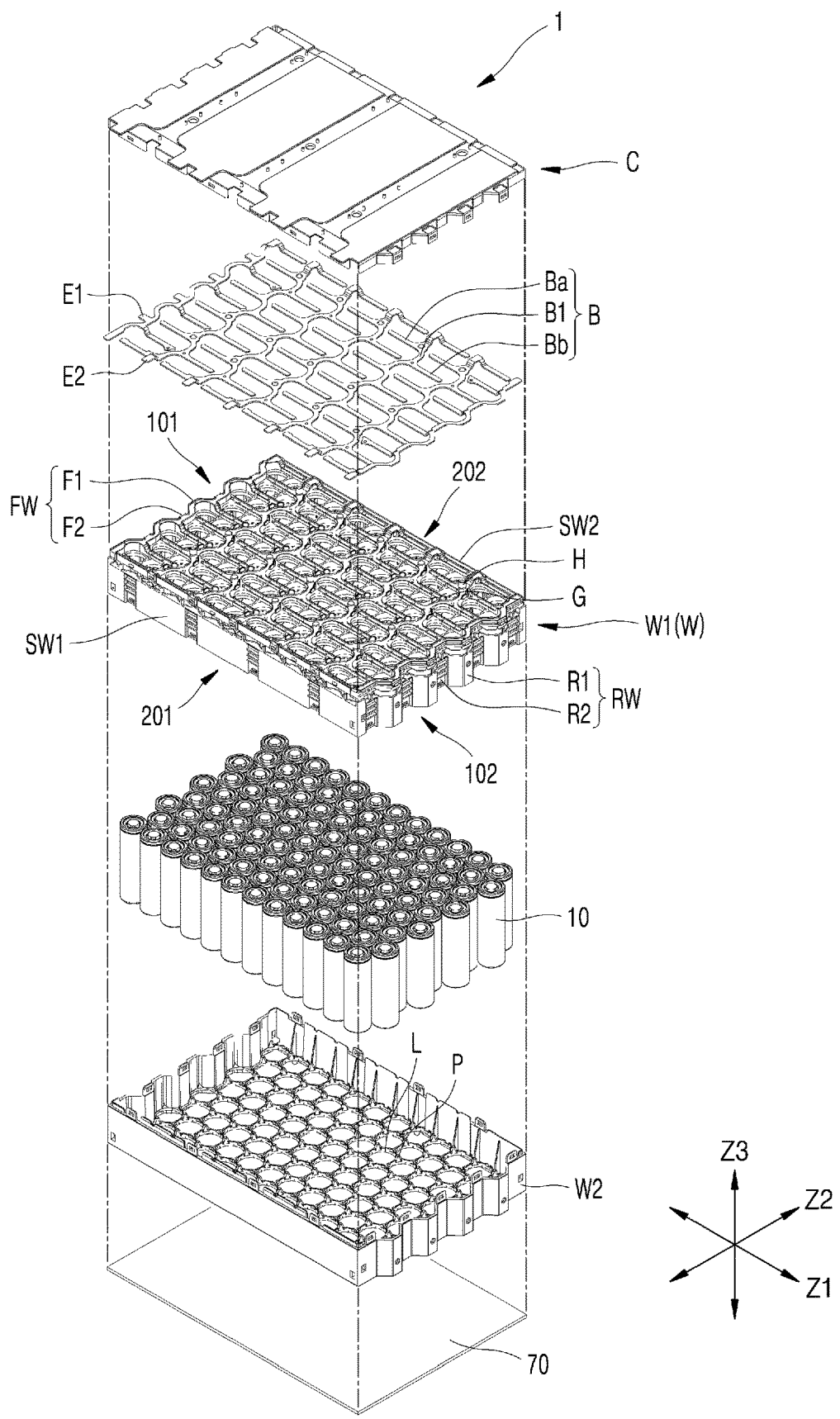
FIG. 1 is an exploded perspective view of a battery pack according to an embodiment.

Reference will now be made in detail to embodiments, examples of which are illustrated in the accompanying drawings. The embodiments described herein may have different forms and neither the described embodiments nor the present disclosure should not be construed as being limited to the descriptions set forth herein. Accordingly, embodiments are merely described below, by referring to the figures, to explain aspects and features of the present description.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on,"

"directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of" and "any one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Hereinafter, a battery pack according to an embodiment will be described with reference to the accompanying drawings.

Figure 2:
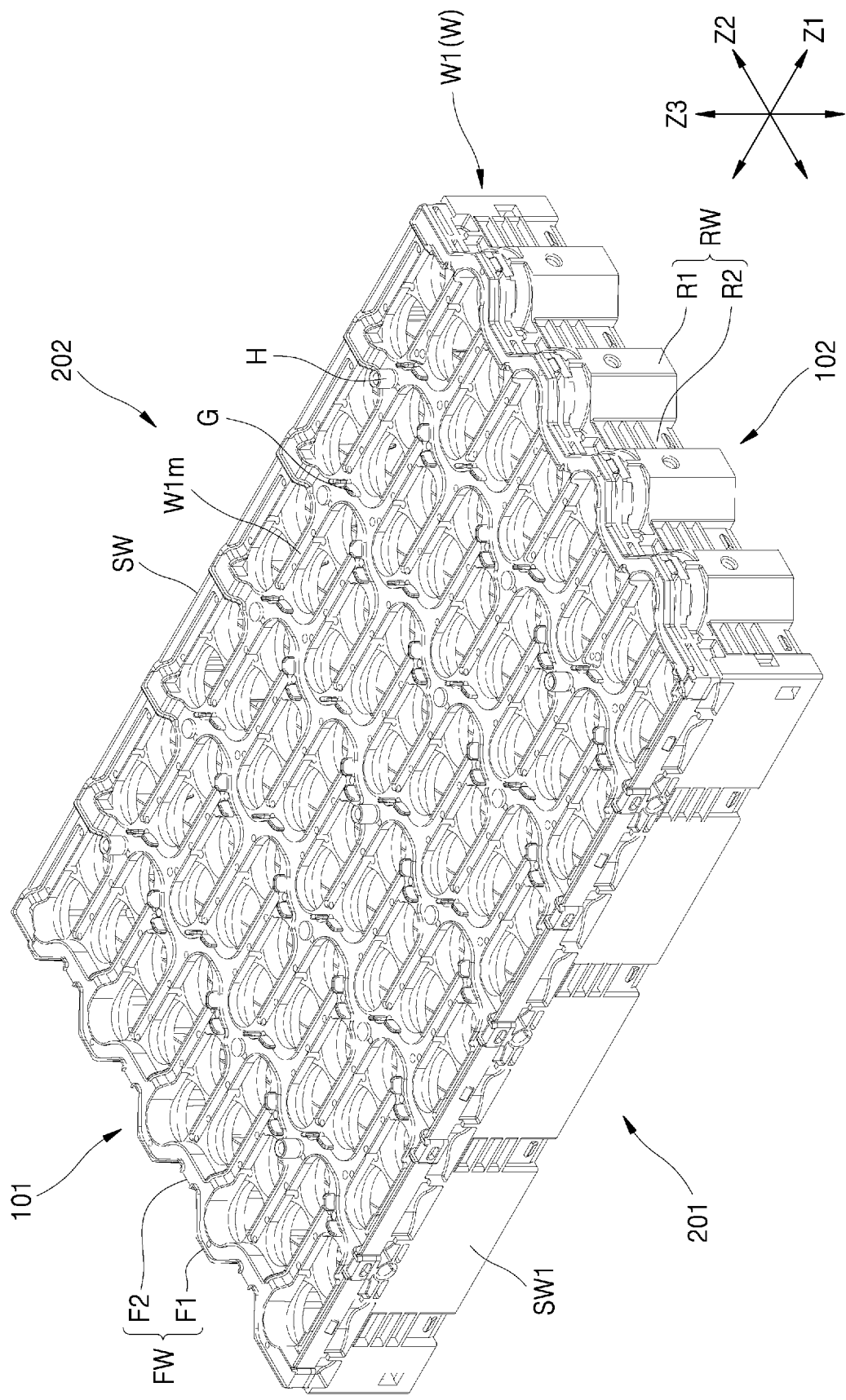
FIGS. 2 and 3 are perspective views of an upper holder and a lower holder illustrated in FIG. 1, respectively.
Figure 3:
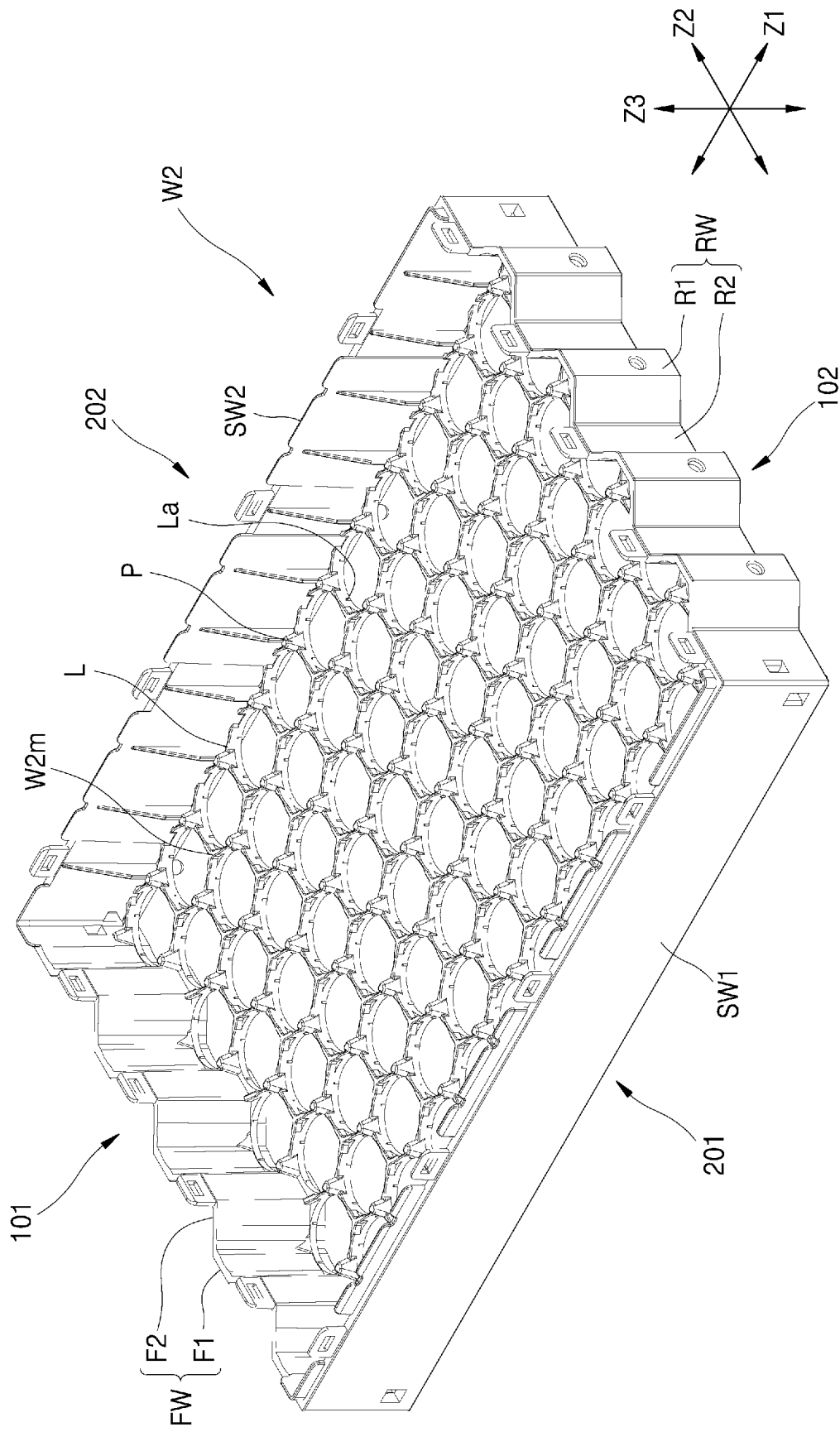
Figure 4:
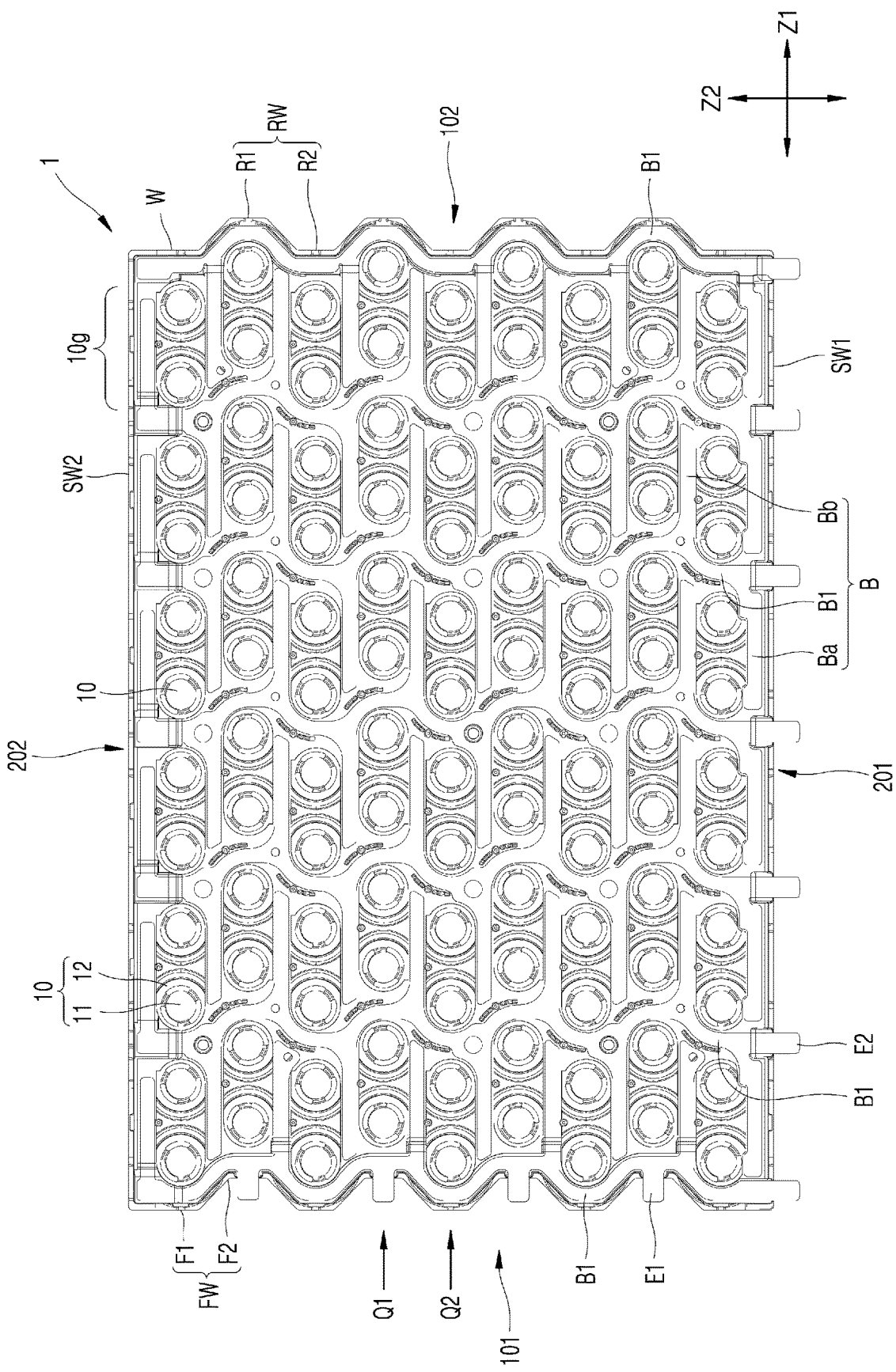
FIG. 4 is a plan view illustrating an arrangement of busbars and battery cells of the battery pack illustrated in FIG. 1.
Figure 5:
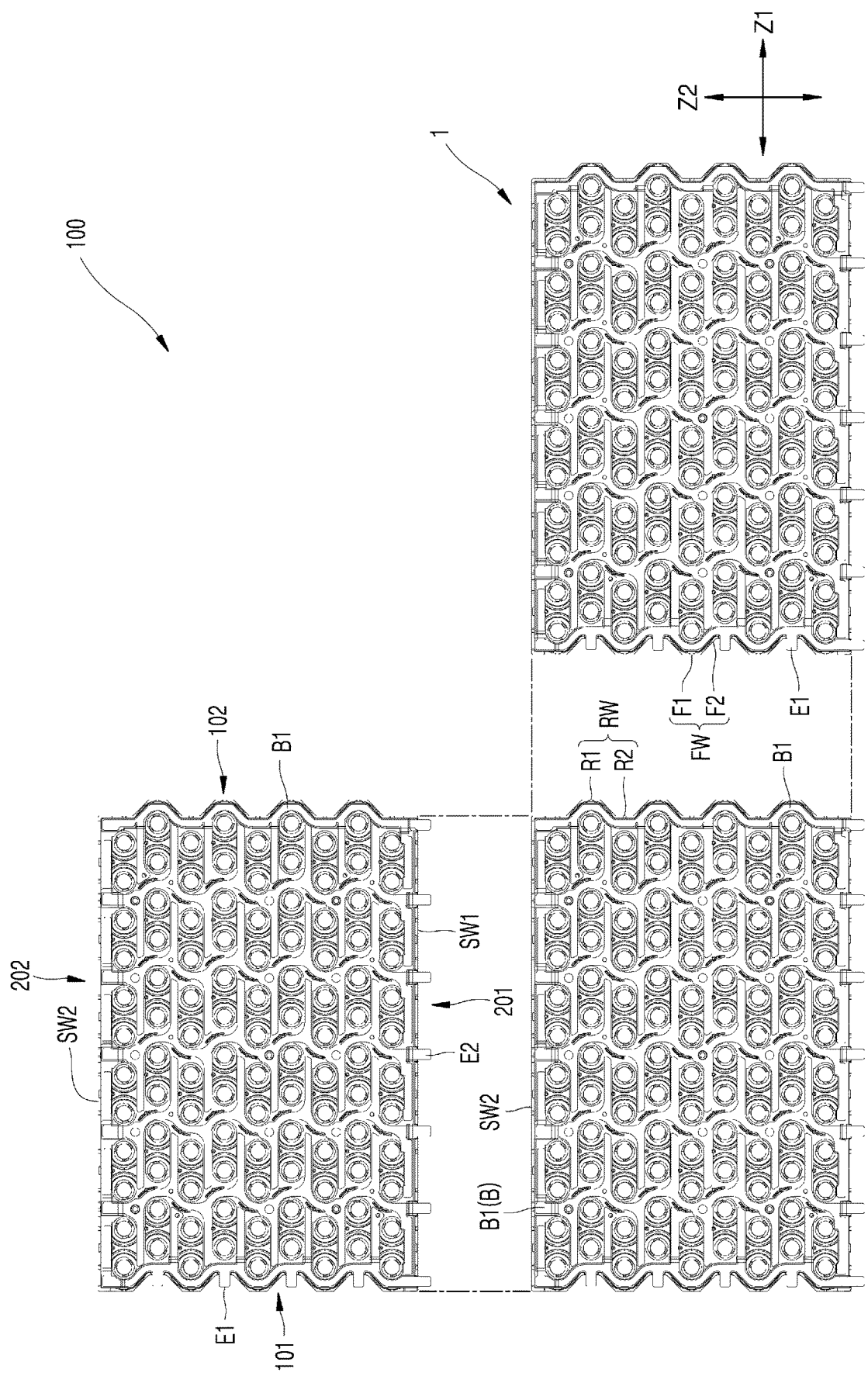
FIGS. 5 and 6 are plan views illustrating a structure in which the battery pack illustrated in FIG. 4 is expanded in a row direction and a column direction and connected in the row direction and the column direction, respectively.
Figure 6:
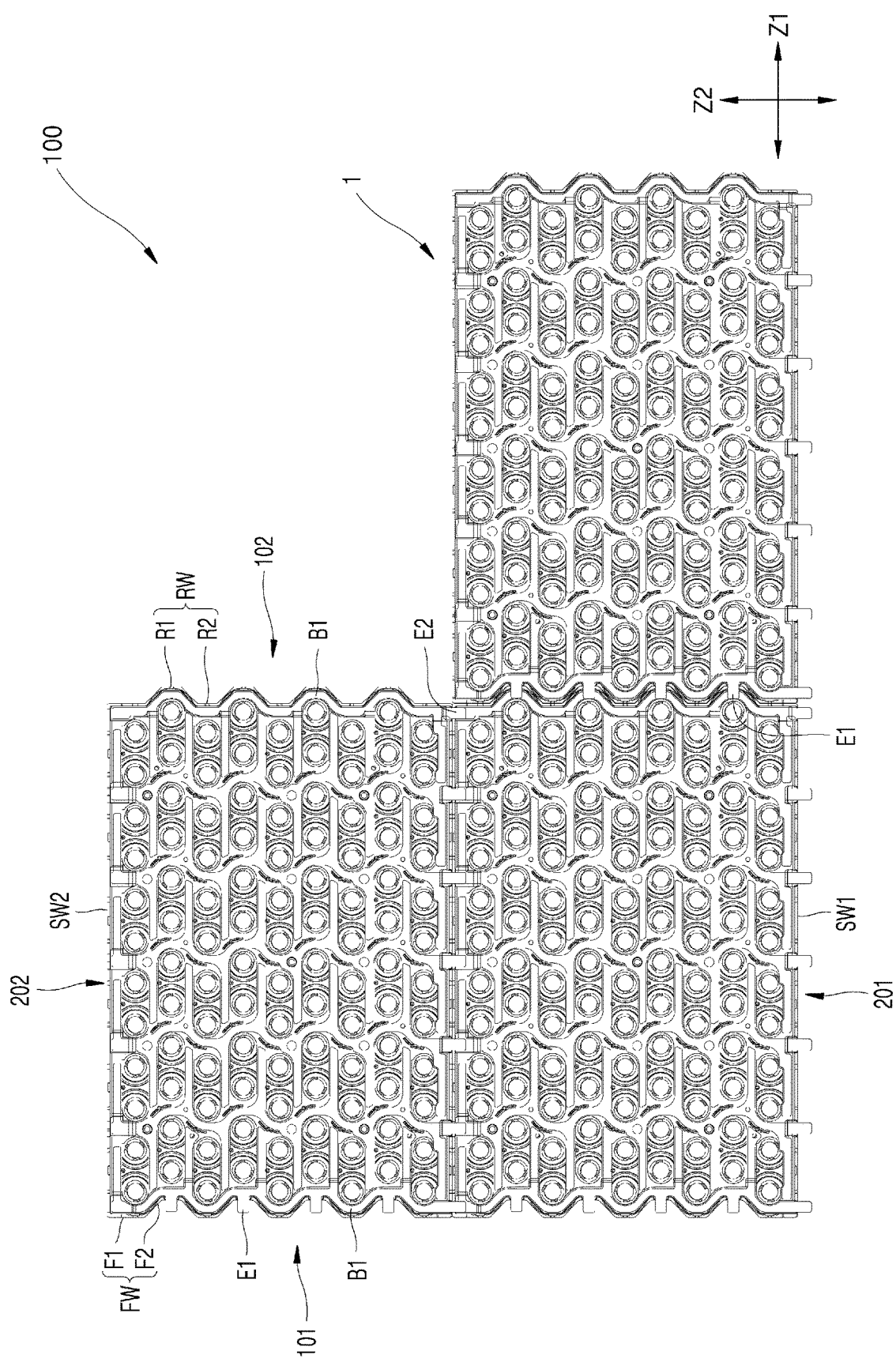

FIG. 1 is an exploded perspective view of a battery pack according to an embodiment. FIGS. 2 and 3 are perspective views of an upper holder and a lower holder illustrated in FIG. 1, respectively. FIG. 4 is a plan view illustrating the arrangement of busbars and battery cells of the battery pack illustrated in FIG. 1. FIGS. 5 and 6 are plan views illustrating a structure in which the battery pack illustrated in FIG. 4 is expanded in a row direction and a column direction and connected in the row direction and the column direction, respectively.

Referring to FIGS. 1 to 4 together, a battery pack 1, according to an embodiment of the present disclosure, may include battery cells 10 arranged in a plurality of rows in (or extending in) a row direction Z1 with adjacent rows of battery cells 10 being adjacent to each other in a column direction Z2 crossing (e.g., intersecting) the row direction Z1. The battery cells 10 in adjacent rows are alternately shifted to front positions or rear positions in the row direction Z1 so that they may be more tightly packed. The battery pack 1 also includes a cell holder W and busbars B. The cell holder W forms (e.g., surrounds or extends around) an accommodation space in which the battery cells 10 are accommodated and includes front walls FW and rear walls RW, which are arranged to face each other in the row direction Z1 with the accommodation space therebetween and are formed in complementary shapes. The busbars B are arranged in the accommodation space to connect a plurality of battery cells 10 to each other. Expansion pieces E1 and E2 extend from the busbars B toward the outside of the accommodation space in which the plurality of battery cells 10 are accommodated and/or toward the outside of the plurality of battery cells 10.

The battery cells 10 may include a plurality of battery cells 10 arranged in the row direction Z1, and a plurality rows of battery cells 10 arranged in the row direction Z1 may be arranged adjacent to each other in the column direction Z2. Throughout the specification, the row direction Z1 is a direction in which the battery cells 10 are arranged and may refer to a front-rear direction in which adjacent rows are alternately arranged to be shifted to front positions or rear positions. In an embodiment, the row direction Z1 may refer to a direction in which the plurality of battery cells 10 are arranged in a straight line, and it may also be understood that the plurality of battery cells 10 are arranged in the column direction Z2 crossing the row direction Z1. However, the battery cells 10 arranged in the column direction Z2 are not in a straight line but are in a zigzag arrangement. For example, in an embodiment, the battery cells 10 may be arranged in a straight line in the row direction Z1 such that rows adjacent to each other are arranged to be shifted to forward positions or rear positions in the row direction Z1, and thus, arranged in a zigzag form rather than in a straight line, in the column direction Z2.

In an embodiment, that adjacent rows (e.g., the battery cells 10 in adjacent rows) are alternately arranged to be shifted to front positions or rear positions in the row direction Z1 means that one row of battery cells 10 is arranged to be fitted into a valley (e.g., in a space between or partially between battery cells 10) of an adjacent row of battery cells 10, and thus, a dense arrangement of the battery cells 10 is implemented. For example, first and second rows Q1 and Q2 (see, e.g., FIG. 4) of battery cells 10 adjacent to each other may be alternately arranged to be shifted to a rear position and a front position in the row direction Z1, respectively, and thus, the battery cells 10 in the first row Q1 may be fitted into a valley of the battery cells 10 in the adjacent second row Q2, in the row direction Z1, and conversely, the battery cells 10 in the second row Q2 may be fitted into a valley of the battery cells 10 in the adjacent first row Q1, in the row direction Z1. As such, when adjacent rows are alternately arranged to be shifted to front positions or rear positions in the row direction Z1, a greater number of battery cells 10 may be densely arranged in a small area and the energy density of the battery pack 1 may be increased.

Referring to FIGS. 1 to 4, in an embodiment, according to the arrangement of the battery cells 10 in which adjacent rows are arranged in a zigzag pattern, the shape of the cell holder W accommodating the battery cells 10 may be formed in a shape corresponding to the arrangement of the battery cells 10. In an embodiment, the cell holder W accommodating the battery cells 10 may include walls surrounding (e.g., extending around a periphery of) the accommodation space in which the battery cells 10 are accommodated. The walls of the cell holder W may include the front walls FW and the rear walls RW facing each other in the row direction Z1, and a first sidewall SW1 and a second sidewall SW2 facing each other in the column direction Z2. In an embodiment, the front wall FW may have a first convex portion F1 formed to protrude forward to correspond to (e.g., to accommodate) a row that is arranged to be shifted to a front position and a first concave portion F2 drawn in (e.g., recessed in) from the front to correspond to a row arranged to be shifted to a rear position. The first convex portion F1 and the first concave portion F2 may be alternatively arranged in the column direction Z2 to correspond to the battery cells 10 that are alternately arranged to be shifted to the front position or the rear position in the column direction Z2 and may be connected to each other (e.g., may be integral with each other) to constitute the front wall FW.

Similar to the front wall FW, the rear wall RW may have a second convex portion R1 formed to protrude backward (e.g., formed to protrude away from the front wall FW) in response to a row that is arranged to be shifted to a rear position and a second concave portion R2 drawn in (e.g., recessed in) from the rear to correspond to a row that is arranged to be shifted to a front position. The second convex portion R1 and the second concave portion R2 may be alternatively arranged in the column direction Z2 to correspond to the battery cells 10 that are alternately arranged to be shifted to the rear position or the front position in the column direction Z2 and may be connected to each other (e.g., may be integral with each other) to constitute the rear wall RW.

In an embodiment, that one row is arranged to be shifted to a front position means that the first convex portion F1 of the front wall FW corresponds to that one row and the second concave portion R2 of the rear wall RW correspond to that one row. As such, in an embodiment, the first convex portion F1 of the front wall FW and the second concave portion R2 of the rear wall RW may be formed in the same row position and may be formed in complementary shapes to be fitted into each other at the same row position. Similarly, that one row is arranged to be shifted to a rear position means that the first concave portion F2 of the front wall FW corresponds to that one row and the second convex portion R1 of the rear wall RW corresponds to that one row. As such, in an embodiment, the first concave portion F2 of the front wall FW and the second convex portion R1 of the rear wall RW may be formed in the same row position and may be formed in complementary shapes to be fitted into each other at the same row position.

In an embodiment, that the first convex portion F1 of the front wall FW and the second concave portion R2 of the rear wall RW, and the first concave portion F2 of the front wall FW and the second convex portion R1 of the rear wall RW are formed in complementary shapes to be fitted into each other at the same row position may mean that modules 100 (see, e.g., FIGS. 5 and 6) having various outputs and capacities may be provided in such a manner that a plurality of battery packs 1 as units having the same structure are connected to each other, such that modules 100 may be adaptively configured and/or assembled respond to various outputs and capacities by increasing or decreasing the number of battery packs 1 having the same structure and included in the module 100, providing an easily expandable battery pack 1.

In an embodiment, different from the front walls FW and the rear walls RW, the first and second sidewalls SW1 and SW2 may be formed to be flat, and the module 100 may be expanded to include a plurality of battery packs 1 in the column direction Z2 with the first and second sidewalls SW1 and SW2 of the battery packs 1 arranged adjacent to each other (e.g., in contact with each other) in the column direction Z2 at the flat outer surfaces.

Referring to FIGS. 5 and 6, in the module 100 expanded to include a plurality of battery packs 1, the battery packs 1 adjacent to each other may be fitted to each other. For example, that the battery packs 1 adjacent to each other are fitted to each other may include that the front wall FW of one battery pack 1 and the rear wall RW of the other adjacent battery pack 1 are fitted to each other and may mean that the structure of the front wall FW of one battery pack 1 and the structure of the rear wall RW of the other adjacent battery pack 1 are formed to be complementary to each other such that the first convex portion F1 and the first concave portion F2 formed in the front wall FW of the one battery pack 1 are fitted into the second concave portion R2 and the second convex portion R1 formed in the rear wall RW of the other adjacent battery pack 1. In addition, in the module 100 expanded to include a plurality of battery packs 1 as units having the same structure, for the battery packs 1 adjacent to each other to be fitted to each other, the front walls FW and the rear walls RW of the same battery packs 1 may have complementary shapes, and in the battery packs 1, the front walls FW and the rear walls RW in the same row position may include the first convex portions F1 and the second concave portions R2 having complementary shapes, or may include the first concave portions F2 and the second convex portions R1 having complementary shapes.

For example, to provide expandability of the battery packs 1 having the same structure, adjacent battery packs 1 may be arranged in the same orientation, and the rear walls RW of a front battery pack 1 and the front walls FW of a rear battery pack 1 having complementary shapes fittable into each other.

Referring to FIG. 4, the plurality of battery cells 10 may be electrically connected to each other through the busbars B. For example, the busbar B may connect different battery cells 10 to each other in parallel by connecting the same polarities of the battery cells 10 to each other in parallel or may connect different battery cells 10 to each other in series by connecting different polarities of the battery cells 10 to each other. The battery cell 10 may include first and second electrodes 11 and 12 having different polarities, and in an embodiment, the first and second electrodes 11 and 12 may be formed at the upper end of the battery cell 10 in a height direction Z3 cross (e.g., intersecting) the row direction Z1 and the column direction Z2. In such an embodiment, the first electrode 11 may be formed at a central position of the upper end of the battery cell 10, and the second electrode 12 may be formed at an edge position surrounding (e.g., extending around a periphery of) the first electrode 11. In addition, the second electrode 12 may extend from the edge position of the upper end of the battery cell 10 to the lower end in the height direction Z3 and may be formed over the entire lower end of the battery cell 10 and may form a side surface between (e.g., extending between) the upper end and the lower end of the battery cell 10.

In an embodiment, the busbars B may connect a group of battery cells 10g (parallel group) (see, e.g., FIG. 4), including a plurality of adjacent battery cells 10, to each other in parallel and may connect a plurality of battery cells 10 to each other in series and parallel by connecting adjacent different groups of battery cells 10g (parallel groups) to each other in series. In various embodiments, the number of battery cells 10 constituting the group of battery cells 10g (parallel group) connected to each other in parallel or the number of groups of battery cells 10g (parallel groups) connected to each other in series may be variously designed in response to desired output and capacity characteristics.

In an embodiment, a group of battery cells 10g (parallel group) connected to each other in parallel may be arranged in the row direction Z1, different groups of battery cells 10g (parallel groups) adjacent to each other in the row direction Z1 may be connected to each other in series, and a body portion B1 of the busbar B may extend between the groups of battery cells 10g (parallel groups) adjacent to each other in the row direction Z1. The busbar B may include the body portion B1 extending between groups of battery cells 10g (parallel groups) adjacent to each other in the row direction Z1 and first and second branch portions Ba and Bb extending from the body portion B1 toward the group of battery cells 10g (parallel groups) adjacent to each other with the body portion B1 as a boundary therebetween. The body portion B1 of the busbar B may be arranged in a zigzag shape in the column direction Z2 between the groups of battery cells 10g (parallel groups) adjacent to each other in the row direction Z1. The group of battery cells 10g (parallel group) connected to each other in parallel may include columns of the battery cells 10 arranged in a zigzag shape, and the body portion B1 of the busbar B extending along the boundary of the group of battery cells 10g connected to each other in parallel may extend in a zigzag shape along the columns of the battery cells 10 arranged in the zigzag shape.

The body portion B1 of the busbar B may electrically connect the first and second branch portions Ba and Bb extending from the body portion B1 to each other. For example, the first and second branch portions Ba and Bb may extend from the body portion B1 toward different groups of battery cells 10g (parallel groups) arranged on both sides of the body portion B1 in the row direction Z1. In an embodiment, the first and second branch portions Ba and Bb may extend in the row direction Z1 and may extend in a straight line along between the battery cells 10 arranged in a straight line in the row direction Z1. For example, the first and second branch portions Ba and Bb may extend from the body portion B1 of the busbar B in the row direction Z1 and its opposite direction, respectively, and may be formed at positions alternating with each other in the column direction Z2. For example, the first and second branch portions Ba and Bb may extend between adjacent rows of battery cells 10 along the body portion B1 extending on the zigzag in the column direction Z2 and may extend between the rows of battery cells 10 at positions alternating with each other in the column direction Z2.

In an embodiment, the group of battery cells 10g (parallel group) connected to each other in parallel may be arranged in the row direction Z1, and the body portion B1 of the busbar B may arranged between the groups of battery cells 10g (parallel groups) adjacent to each other in the row direction Z1. For example, the body portions B1 of the busbars B may be arranged in the row direction Z1, and the first and second branch portions Ba and Bb extending from the body portions B1 of the busbars B adjacent to each other toward the groups of battery cells 10g (parallel groups) arranged between the body portions B1 of adjacent busbars B may be arranged to be fitted into each other in the form of a comb. In an embodiment, the first and second branch portions Ba and Bb extending from the body portions B1 of the busbars B adjacent to each other may be fitted into each other without physical interference (e.g., without contacting each other), and to this end, the first and second branch portions Ba and Bb may extend toward positions alternating with each other in the column direction Z2 from the body portions B1 of the busbars B extending in the zigzag in the column direction Z2.

In an embodiment, the first and second branch portions Ba and Bb may extend in parallel with each other in the row direction Z1 toward positions alternating with each other in the column direction Z2 to be fitted into each other (e.g., to be fitted between each other) in each of the parallel groups 10g arranged in the row direction Z1. For example, in an embodiment, the first and second branch portions Ba and Bb may be fitted into each other while protruding from the body portions B1 of the different busbars B arranged on both sides around each parallel group 10g toward each parallel group 10g.

In an embodiment, electrical connections between the plurality of battery cells 10 may be implemented as a combination of series and parallel connections including parallel connections and series connections between the battery cells 10. For example, in an embodiment, combined electrical connections including series and parallel connections may be implemented between the plurality of battery cells 10 through a series connection between a group of battery cells 10g (parallel group) connected to each other in parallel to each other from among the plurality of battery cells 10 and another group of battery cells 10g (parallel group) connected to each other in parallel.

A plurality of busbars B arranged on the battery cells 10 may connect a group of battery cells 10g (parallel group) arranged adjacent to each other positions, to each other in parallel, and may connect the group of battery cells 10g (parallel group), to another adjacent group of battery cells 10g (parallel group) in series. In an embodiment, the arrangement of the plurality of battery cells 10 in the row direction Z1 and the column direction Z2 may include a plurality of rows of battery cells 10 arranged in a straight line in the row direction Z1, and a plurality of columns of battery cells 10 arranged in a zigzag in the column direction Z2. In such an embodiment, the busbar B may connect the battery cells 10 of adjacent two columns arranged in a zigzag to each other in parallel, and for example, may connect a group of battery cells 10g (parallel group) including the adjacent two columns of battery cells 10 to each other in parallel by connecting the adjacent two columns of battery cells 10 to each other in parallel. In addition, the busbar B may electrically connect the plurality of battery cells 10 arranged in the row direction Z1 and the column direction Z2 in a combined manner including series and parallel connections by connecting two adjacent columns of battery cells 10 to each other in parallel to form a group of battery cells 10g (parallel group) connected to each other in parallel and connecting different groups of battery cells 10g (parallel groups) adjacent to each other in the row direction Z1 to each other in series with a unit of adjacent two columns of battery cells 10 connected to each other in parallel. For example, in an embodiment, assuming that battery cells 10 of two adjacent columns connected to each other in parallel constitute a group of battery cells 10g (parallel group) connected to each other in parallel, a total of six different groups of battery cells 10g (parallel groups) may be formed in the row direction Z1. For example, the group of battery cells 10g (parallel group) connected to each other in parallel and the other group of battery cells 10g (parallel group) adjacent thereto in the row direction Z1 may be arranged adjacent to each other with the body portion B1 of the busbar B therebetween, and a total of six groups of battery cells 10g (parallel groups) connected to each other in parallel (e.g., six units of group of battery cells 10g (parallel group) connected to each other in parallel) may be formed with the body portions B1 of five busbars B therebetween. In more detail, in an embodiment, a group of battery cells 10g (parallel group) connected to each other in parallel may include two columns of battery cells 10 adjacent to each other, each column of battery cells 10 may include nine battery cells 10 arranged in a zigzag, and thus, the group of battery cells 10g (parallel group) connected to each other in parallel may include a total of 18 battery cells 10. In an embodiment, 18 battery cells 10 connected to each other in parallel may constitute a group of battery cells 10g (parallel group), and a total of 6 groups of battery cells 10g (parallel groups) may be connected to each other in series in the row direction Z1 to constitute a structure in which six units, each of which includes 18 battery cells 10, are connected to each other in series to form a 6S18P electrical connection. In addition, in the 6S18P electrical connection according to an embodiment, a group of battery cells 10g (parallel group) including 18 battery cells 10 forming a parallel connection with each other may include two columns of battery cells 10, and each column of the battery cells 10 may include nine battery cells 10. In an embodiment, according to the number and arrangement of groups of battery cells 10g (parallel groups) connected to each other in parallel, the battery pack 1 may include four protruding walls (corresponding to the first convex portions F1 or the second convex portions R1) protruding in the row direction Z1. In an embodiment, the protruding wall (corresponding to the first convex portion F1 or the second convex portion R1) may be formed in at least one of the front wall FW and the rear wall RW in the row direction Z1, and for example, in an embodiment, the four protruding walls (corresponding to the first convex portions F1 or the second convex portions R1) may be formed in the rear wall RW. Throughout the specification, assuming that the front walls FW or the rear walls RW include four protruding walls (corresponding to the first convex portions F1 or the second convex portions R1) in the row direction Z1, the number of protruding walls (corresponding to the first convex portions F1 or the second convex portions R1) may mean the total number of protruding walls (corresponding to the first convex portions F1 or the second convex portions R1) formed in the front walls FW or the rear walls RW and may mean the number of protruding walls (corresponding to the first convex portions F1) protruding from the front walls FW toward the outside, that is, toward the front, or the number of protruding walls (corresponding to the second convex portions R1) protruding from the rear walls RW toward the outside, that is, toward the rear. In an embodiment, assuming the rear walls RW have four protruding walls (corresponding to the second convex portions R1), the four protruding walls (corresponding to the second convex portions R1) mean the total number of protruding walls (corresponding to the second convex portions R1) formed on the rear walls RW, for example, that the number of protruding walls (corresponding to the second convex portions R1) protruding from the rear walls RW toward the outside, that is, toward the rear, is four, and may exclude a case in which the rear walls RW includes less than four protruding walls (corresponding to the second convex portions R1) or more than four protruding walls (corresponding to the second convex portions R1).

In various embodiments, the total number of battery cells 10 constituting the battery pack 1, the number of parallel and series connections, and the like may be variously modified according to a desired output and capacity for the battery pack 1. Generally, assuming that the battery pack 1 according to an embodiment of the present disclosure includes a plurality of battery cells 10 forming an mSnP electrical connection, a group of battery cells 10g (parallel group) forming parallel connections with each other may include n battery cells 10, and the entire battery pack 1 may constitute a structure in which m units, each of which includes n battery cells 10 connected to each other in parallel, are connected to each other in series. Assuming the n battery cells 10 constitute a group of battery cells 10g (parallel group) forming parallel connections with each other, the group of battery cells 10g (parallel group) including the n battery cells 10 may be arranged in L columns, and each column of battery cells 10 may include K battery cells 10. The number of protruding walls (corresponding to the first convex portions F1 or the second convex portions R1) protruding from the front walls FW or the rear walls RW to the outside in the row direction Z1 may be determined depending on whether K is an even number or an odd number, and the number of protruding walls (corresponding to the first convex portions F1 or the second convex portions R1) protruding from the front walls FW or the rear walls RW toward the outside, or, more generally, from the wall of the cell holder W toward the outside may be determined based on the following relationships. When K is an even number, the number of protruding walls (corresponding to the first convex portions F1 or the second convex portions R1) is K/2; and when K is an odd number, the number of protruding walls (corresponding to the first convex portions F1 or the second convex portions R1) is (K−1)/2.

In an embodiment, a plurality of battery cells 10 may include a plurality of battery cells 10 arranged in the row direction Z1, and the battery cells 10 in adjacent rows may be alternately arranged to be shifted to front positions or rear positions in the row direction Z1, in which case, a row of battery cells 10 protruding to the front position or the rear position in the row direction Z1 may form (or may be fitted into) a protruding wall (corresponding to the first convex portion F1 or the second convex portion R1) protruding from the cell holder W for accommodating the battery cells 10, to a front position or a rear position. According to the number of battery cells 10 constituting the column of battery cells 10, when the number K of battery cells 10 constituting the column of battery cells 10 is an even number, the number of protruding walls (corresponding to the first convex portions F1 or the second convex portions R1) may be determined to be K/2 according to the arrangement of the battery cells 10 alternately arranged in the front positions or the rear positions in the row direction Z1, and for example, K/2 protruding walls (corresponding to the first convex portions F1 or the second convex portions R1) may be formed in both of the front walls FW and the rear walls RW. When the number K of battery cells 10 constituting the column of battery cells 10 is an odd number, the number of protruding walls (corresponding to the first convex portions F1 or the second convex portions R1) may be determined to be (K−1)/2 according to the arrangement of the battery cells 10 alternately arranged in the front positions or the rear positions in the row direction Z1, and for example, (K−1)/2 protruding walls (corresponding to the first convex portions F1 or the second convex portions R1) may be formed in the front walls FW or the rear walls RW. For example, assuming that the battery pack 1 according to an embodiment forms an mSnP electrical connection, a total of m units, each of which is a group of battery cells 10g (parallel group) including n battery cells 10 connected to each other in parallel, may be arranged in the row direction Z1, and the m units arranged adjacent to each other in the row direction Z1 may be connected to each other in series. In addition, when a group of battery cells 10g (parallel group) including n battery cells 10 connected to each other in parallel is arranged in L columns, and each column of battery cells 10 includes K battery cells 10, the number of protruding walls (corresponding to the first convex portions F1 or the second convex portions R1) protruding from the wall of the cell holder W toward the outside may be determined according to the number K of battery cells 10 included in each column of battery cells 10. In an embodiment, according to the number K of battery cells 10 included in each column of battery cells 10, K/2 protruding walls (corresponding to the first convex portions F1 or the second convex portions R1) may be formed in both the front walls FW and the rear walls RW in the row direction Z1 or (K−1)/2 protruding walls (corresponding to the first convex portions F1 or the second convex portions R1) may be formed in the front walls FW or the rear walls RW.

In an embodiment, the body portions B1 of the busbars B may be arranged in the row direction Z1, and each body portion B1 may extend in a zigzag shape in the column direction Z2. As will be described below, the foremost body portion B1 and the rearmost body portion B1 in the row direction Z1 may be formed in shapes fitted to the front walls FW and the rear walls RW, respectively.

The foremost body portion B1 and the front walls FW may include the first convex portion F1 formed to protrude forward in response to a row of battery cells 10 arranged to be shifted to a front position, and the first concave portion F2 drawn in from the front to correspond to an adjacent row of battery cells 10 arranged to be shifted to a rear position, and as such, the first convex portions F1 and the first concave portions F2 may be alternately arranged in the column direction Z2 to extend in a zigzag shape (e.g., a first zigzag shape) in the column direction Z2. Similarly, the rearmost body portion B1 and the rear walls FW may include the second convex portion R1 formed to protrude backward in response to a row of battery cells 10 arranged to be shifted to a rear position, and the second concave portion R2 drawn in from the rear to correspond to an adjacent row of battery cells 10 arranged to be shifted to a front position, and as such, the second convex portions R1 and the second concave portions R2 may be alternately arranged in the column direction Z2 to extend in a zigzag shape (e.g., a second zigzag shape) in the column direction Z2.

The zigzag shape (e.g., the first zigzag shape) of the foremost body portion B1 and the front walls FW, and the zigzag shape (e.g., the second zigzag shape) of the rearmost body portion B1 and the rear walls RW may be formed complementary to each other such that the foremost body portion B1 and the rearmost body portion B1 form a complementary shape with each other, and the front walls FW and the rear walls RW may also form a complementary shape with each other. As will be described below, the complementary shape of the foremost body portion B1 and the rearmost body portion B1 may enable an electrical connection between battery packs 1 adjacent to each other in the module 100 expanded in the row direction Z1, such that the battery packs 1 are electrically connected to each other through the first expansion pieces E1 formed in any one of the foremost body portion B1 and the rearmost body portion B1. In addition, the complementary shape of the front walls FW and the rear walls RW may enable a physical connection between the battery packs 1 adjacent to each other in the module 100 expanded in the row direction Z1 through fitting to each other.

In an embodiment, the first branch portions Ba may extend toward, from among groups of battery cells 10g (parallel groups) respectively arranged on both sides with respect to the body portion B1 of the busbar B, the group of battery cells 10g (parallel group) arranged on one side to connect the group of battery cells 10g (parallel group) to each other in parallel, and the second branch portion Bb may extend toward the group of battery cells 10g (parallel group) arranged on the other side with respect to the body part B1 of the busbar B to connect the group of battery cells 10g (parallel group) to each other in parallel. The body portion B1 of the busbar B may connect the first and second branch portions Ba and Bb to each other and, thus, may connect the group of battery cells 10g (parallel group) on the one side connected to the first branch portions Ba and the group of battery cells 10g (parallel group) on the other side connected to the second branch portions Bb to each other in series.

In an embodiment, that the first branch portions Ba connect a group of battery cells 10g (parallel group) arranged on one side with respect to the body portion B1 of the busbar B to each other in parallel, that the second branch portions Bb connect a group of battery cells 10g (parallel group) arranged on the other side with respect to the body portion B1 of the busbar B to each other in parallel, or that the body portion B1 connecting the first and second branch portions Ba and Bb to each other connects the groups of battery cells 10g (parallel groups) arranged on both sides to each other in series may mean that the battery cells 10 are connected to each other in parallel or in series through connection members 50 (see, e.g., FIG. 16) connected to the busbars B rather than that the busbars form parallel or series connections by themselves.

In an embodiment, the connection member 50 (see, e.g., FIG. 16) may be between the busbar B and the battery cell 10 to mediate a connection therebetween. In an embodiment, the connection member 50 may include a conductive wire or a conductive ribbon and may be connected between the busbar B and the battery cell 10 through wire bonding or ribbon bonding. For example, the connection member 50 may be connected between the busbar B and the electrodes 11 and 12 of the battery cell 10 to form a connection therebetween, and in such an embodiment, regarding series connection or parallel connection, the connection members 50 may connect the electrodes 11 and 12 of different battery cells 10 to each other with the same polarities, respectively, to connect the battery cells 10 to each other in parallel and/or may connect the electrodes 11 and 12 of the battery cells 10 to each other with opposite polarities, respectively, to connect the battery cells 10 to each other in series. Referring to FIG. 4, the connection members 50 may connect a group of battery cells 10g (parallel group) arranged on one side with respect to the body portion B1 of the busbar B to each other in parallel by connecting the same polarities of the group of battery cells 10g (parallel group) arranged on the one side to the first branch portions Ba and, similarly, may connect a group of battery cells 10g (parallel group) arranged on the other side with respect to the body portion B1 of the busbar B to each other in parallel by connecting the same polarities of the group of battery cells 10g (parallel group) arranged on the other side with respect to the body portion B1 of the busbar B to the second branch portions Bb.

The busbars B may be arranged in an accommodation space in which a plurality of battery cells 10 are accommodated to connect the plurality of battery cells 10 to each other, and the expansion pieces E1 and E2 extending from the busbars B may be arranged outside the accommodation space. The expansion pieces E1 and E2 may form an electrical connection between battery packs 1 adjacent to each other in the module 100 expanded to include a plurality of battery packs 1. For example, the expansion pieces E1 and E2 may extend from the busbars B in the row direction Z1 and the column direction Z2, may be arranged outside the accommodation space in which the busbars B are arranged, and in an embodiment, may protrude to the outside of the cell holder W surrounding the accommodation space.

The expansion pieces E1 and E2 may include the first expansion pieces E1 extending from the busbar B in the row direction Z1 and the second expansion pieces E2 extending from the busbars B in the column direction Z2. The first and second expansion pieces E1 and E2 may extend from the busbars B in the row direction Z1 and the column direction Z2 to provide expandability in the row direction Z1 and the column direction Z2, and for example, may provide the module 100 that is expanded in the row direction Z1 and the column direction Z2 to include a plurality of battery packs 1 in the row direction Z1 and the column direction Z2. For example, in the module 100 expanded in the row direction Z1 and the column direction Z2, the first expansion pieces E1 may connect the battery packs 1 adjacent to each other in the row direction Z1 to each other, and the second expansion pieces E2 may connect the battery packs 1 adjacent to each other in the column direction Z2 to each other.

The first and second expansion pieces E1 and E2 may extend from the busbars B arranged in the accommodation space in which the plurality of battery cells 10 are accommodated to the outside of the accommodation space and, for example, may protrude from the cell holder W surrounding the accommodation space. Referring to FIGS. 5 and 6, in the module 100 expanded to include the plurality of battery packs 1, the first and second expansion pieces E1 and E2 protruding from one of battery packs 1 adjacent to each other may be accommodated in the other battery packs 1 such that the first and second expansion pieces E1 and E2 and the busbars B of the adjacent battery packs 1 may be connected to each other, respectively such that the module 100 having an expanded output and capacity may be provided through the connection between the adjacent battery packs 1.

The first and second expansion pieces E1 and E2 may extend from the busbars B and may extend from the busbars B differently in the row direction Z1 and the column direction Z2. Regarding the first expansion pieces E1, in the module 100 expanded in the row direction Z1, battery packs 1 adjacent to each other in the row direction Z1 may provide a module 100 in which a number of units, each of which includes a group of battery cells 10g (parallel group) connected to each other in parallel, which are connected to each other in series, are expanded in the row direction Z1, and the first expansion pieces E1 may extend in the row direction Z1 to connect the adjacent battery packs 1 to each other in the row direction Z1 and, for example, may connect the busbars B connected to groups of battery cells 10g (parallel groups) that form a boundary between the battery packs 1 adjacent to each other in the row direction Z1 to each other to provide the expanded module 100. Regarding the second expansion pieces E2, in the module 100 expanded in the column direction Z2, battery packs 1 adjacent to each other in the column direction Z2 may expand with rows of battery cells 10 in the column direction Z2, and the second expansion pieces E2 may connect rows of battery cells 10 that form a boundary between the battery packs 1 adjacent to each other in the column direction Z2 to each other and, for example, may connect the busbars B connected to the rows of battery cells 10 forming the boundary between the battery packs 1 adjacent to each other in the column direction Z2 to each other to connect the rows of battery cells 10 expanded in the column direction Z2 to each other in parallel.

The first expansion pieces E1 may expand a series connection between groups of battery cells 10g (parallel groups) adjacent to each other in the row direction Z1 in one battery pack 1 to constitute the module 100 including a plurality of battery packs 1 arranged in the row direction Z1, and the second expansion pieces E2 may expand a parallel connection between rows of battery cells 10 adjacent to each other in the column direction Z2 in one battery pack 1 to constitute the module 100 including a plurality of battery packs 1 arranged in the column direction Z2.

The first and second expansion pieces E1 and E2 may extend in the row direction Z1 and the column direction Z2 from the busbars B arranged in the accommodation space in which the plurality of battery cells 10 are accommodated, and for example, may extend from different positions of the busbars B. In an embodiment, the first expansion pieces E1 may extend from the outermost busbar B in the row direction Z1 and, for example, may extend from any one of the foremost body portion B1 and the rearmost body portion B1. In an embodiment, the first expansion pieces E1 may extend in the row direction Z1 from the foremost body portion B1. For example, the foremost body portion B1 and the front walls FW may extend in zigzag shapes that are fitted into each other and may include, in the column direction Z2, the first convex portions F1 protruding forward and the first concave portions F2 drawn in from the front, and the first convex portions F1 and the first concave portions F2 may be alternately formed at alternating positions in the column direction Z2. In such an embodiment, the first expansion pieces E1 may be formed at the positions of the first concave portions F2 in the foremost body portion B1 and may include a plurality of first expansion pieces E1 formed at the positions of the first concave portions F2 in the column direction Z2. Referring to, for example, FIG. 5, in the module 100 expanded in the row direction Z1, the front walls FW (the first concave portions F2) and the rear walls RW (the second convex portions R1) may be fitted into each other, and the first expansion pieces E1 formed at the positions of the first concave portions F2 of the front walls FW may be in contact with the body portion B1 of the busbar B formed at the positions of the second convex portions R1 of the front walls FW such that battery packs 1 adjacent to each other in the row direction Z1 are connected to each other. For example, in front and rear battery packs 1 adjacent to each other in the row direction Z1, the first expansion pieces E1 may connect the rearmost busbar B of the front battery pack 1 and the foremost busbar B of the rear battery pack 1 to each to electrically connect the front and rear battery packs 1 to each other.

In an embodiment, the body portion B1 of any one of the foremost busbar B and the rearmost busbar B facing each other in the row direction Z1 may form a first expansion edge 101 on which the first expansion pieces E1 are formed, and the body portion B1 of the other busbar B may form a first accommodation edge 102 accommodating the first expansion pieces E1. In such an embodiment, the body portion B1 of the busbar B forming the first expansion edge 101 may include the concave portions F2 in which the first expansion pieces E1 are formed, the body portion B1 of the busbar B forming the first accommodation edge 102 may form the convex portions R1 accommodating the first expansion pieces E1, and the concave portions F2 in which the first expansion pieces E1 are formed, and the convex portions R1 accommodating the first expansion pieces E1 may be formed at positions facing each other in the row direction Z1.

A battery pack according to an embodiment may include the front walls FW and the rear walls RW facing each other in the row direction Z1 such that a plurality of battery cells 10 are accommodated therein. In such an embodiment, the front walls FW or the rear walls RW may form the first expansion edge 101 together with the body portion B1 of the busbar B in which the first expansion pieces E1 are formed, and the other of the front or rear wall FW or RW may form the first accommodation edge 102 together with the body portion B1 of the busbar B accommodating the first expansion pieces E1. The wall FW or RW forming the first expansion edge 101 may follow the body portion B1 of the busbar B forming the first expansion edge 101 and, thus, may be arranged in the first zigzag shape, and the wall FW or RW forming the first accommodation edge 102 may follow the body portion B1 of the busbar B forming the first accommodation edge 102 and, thus, may be arranged in the second zigzag shape. In addition, the first and second zigzag shapes may be formed in complementary shapes such that the concave portions F2 and the convex portions F1 of the walls forming the first expansion edge 101 (e.g., the front walls FW) and the convex portions R1 and the concave portions R2 of the walls forming the first accommodation edge 102 (e.g., the rear walls RW) face each other in the row direction Z1, respectively.

In an embodiment, from among the front walls FW and the rear walls RW, the front walls FW in which the first expansion pieces E1 are formed may form the first expansion edge 101 (corresponding to the front walls FW), and the rear walls RW in which the first expansion pieces E1 are not formed may form the first accommodation edge 102 (corresponding to the rear walls RW). Throughout the specification, the expansion edges 101 and 201 may include the body portion B of the busbar B in which the first expansion pieces E1 or the second expansion pieces E2, which may connect battery packs 1 adjacent to each other in the row direction Z1 and the column direction Z2 to each other to be expanded in the row direction Z1 or the column direction Z2, are formed, and/or the walls (corresponding to the front walls FW) adjacent to positions in which the first and second expansion pieces E1 and E2 are formed. In an embodiment, the first expansion edge 101 (corresponding to the front walls FW) and the first accommodation edge 102 (corresponding to the rear walls RW) may refer to the front walls FW and the rear walls RW formed at positions facing each other in the row direction Z1, respectively. As will be described below, regarding the second expansion pieces E2, the first sidewall SW1 in which the second expansion pieces E2 are formed may form a second expansion edge 201 (corresponding to the first sidewall SW1), the second sidewall SW2 in which the second expansion pieces E2 are not formed may form a second accommodation edge 202 (corresponding to the second sidewall SW2), and the second expansion edge 201 (corresponding to the first sidewall SW1) and the second accommodation edge 202 (corresponding to the second sidewall SW2) may refer to the first and second sidewalls SW1 and SW2 formed at positions facing each other in the column direction Z2.

In an embodiment, the second expansion pieces E2 may protrude in the column direction Z2 from the outermost position of the body portion B1 of the busbar B in the column direction Z2. In such an embodiment, from among the positions of one ends and the other ends of the body portions B1 of the busbars B in the column direction Z2, outermost positions on any one side may form the second expansion edge 201 in which the second expansion pieces E2 are formed, and outermost positions on the other side may form the second accommodation edge 202 accommodating the second expansion pieces E2.

A battery pack according to an embodiment may include the first sidewall SW1 and the second sidewall SW2 facing each other in the column direction Z2 such that a plurality of battery cells 10 are accommodated therein. Any one of the first sidewall SW1 and the second sidewall SW2 may form the second expansion edge 201 together with the outermost positions of the body portions B1 of the busbars B in which the second expansion pieces E2 are formed, and the other wall SW1 or SW2 may form the second accommodation edge 202 together with the outermost positions of the body portions B1 of the busbars B accommodating the second expansion pieces E2. The wall (corresponding to the first sidewall SW1) forming the second expansion edge 201 and the wall (corresponding to the second sidewall SW2) forming the second accommodation edge 202 may be formed to be flat and, thus, in contact with each other.

In an embodiment, the second expansion pieces E2 may extend in the column direction Z2 from the outermost positions of the busbars B and may extend from the outermost positions of the busbars B adjacent to any one of the first sidewall SW1 or the second sidewall SW2 in the column direction Z2. In an embodiment, the second expansion pieces E2 may extend from the outermost positions of the busbars B adjacent to the first sidewall SW1. The second expansion pieces E2 may extend in the column direction Z2 from a plurality of busbars B arranged in the row direction Z1. In an embodiment, the second expansion pieces E2 may extend from the body portions B1 of the plurality of busbars B arranged in the row direction Z1. The body portion B1 of the busbar B may extend in a zigzag shape in the column direction Z2, and the second expansion pieces E2 may extend in a straight line from the outermost positions of the body portions B1 adjacent to the first sidewall SW1 in the column direction Z2. Referring to FIG. 5, in the module 100 expanded in the column direction Z2, the first sidewall SW1 and the second sidewall SW2 may be in contact with each other such that the second expansion pieces E2 formed adjacent to the first sidewall SW1 are in contact with the body portions B1 of the busbar B formed adjacent to the second sidewall SW2, and thus, the battery packs 1 adjacent to each other in the column direction Z2 may be connected to each other.

In an embodiment, from among the first sidewall SW1 and the second sidewall SW2, the first sidewall SW1 in which the second expansion pieces E2 are formed may form the second expansion edge 201 (corresponding to the first sidewall SW1), and the second sidewall SW2 in which the second expansion pieces E2 are not formed may form the second accommodation edge 202 (corresponding to the second sidewall SW2). For example, the second expansion edge 201 (corresponding to the first sidewall SW1) and the second accommodation edge 202 (corresponding to the second sidewall SW2) may refer to the first and second sidewalls SW1 and SW2 formed at positions facing each other in the column direction Z2, respectively.

Figure 7:
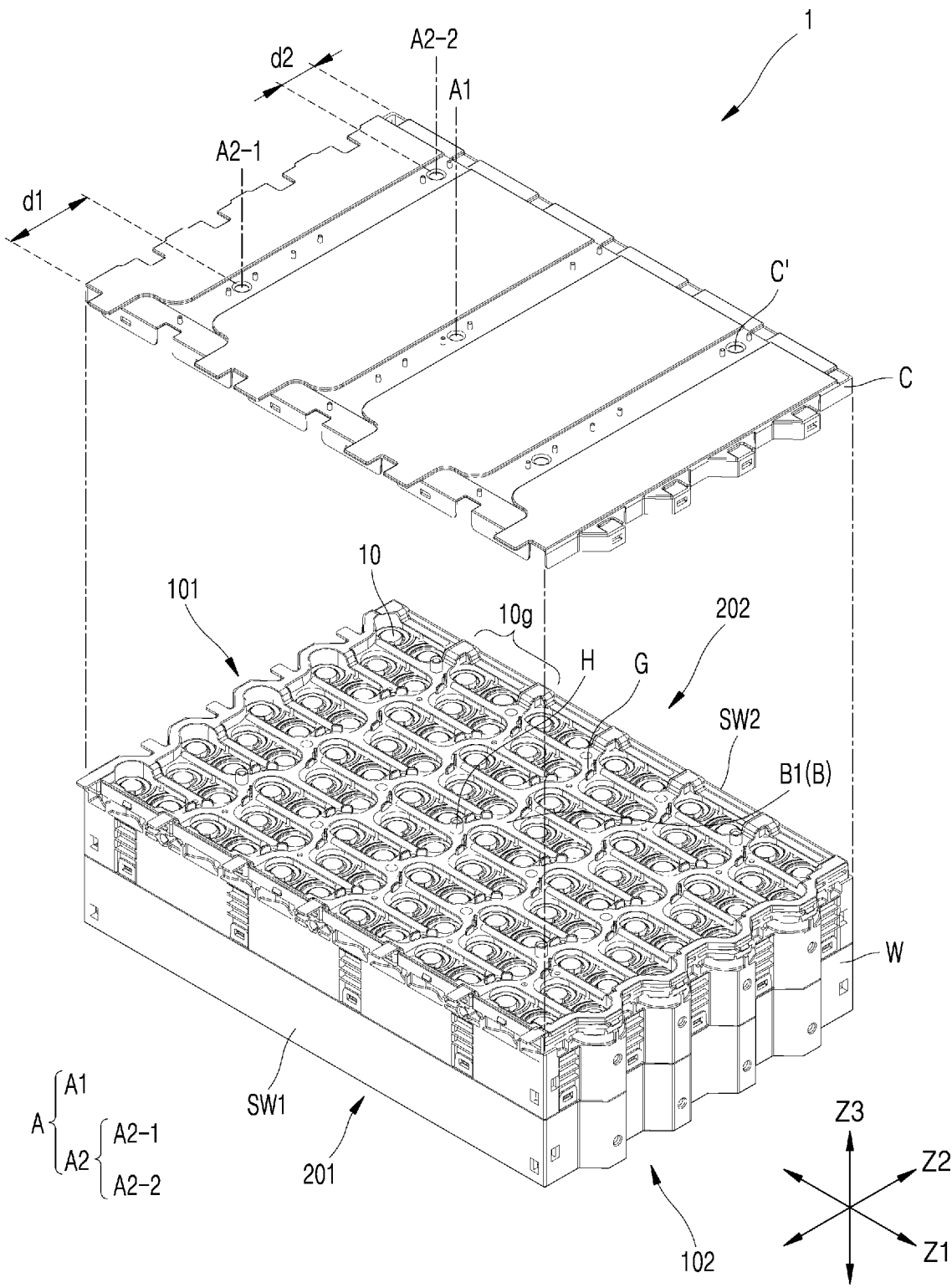
FIG. 7 is an exploded perspective view of a battery pack according to an embodiment.
Figure 8:
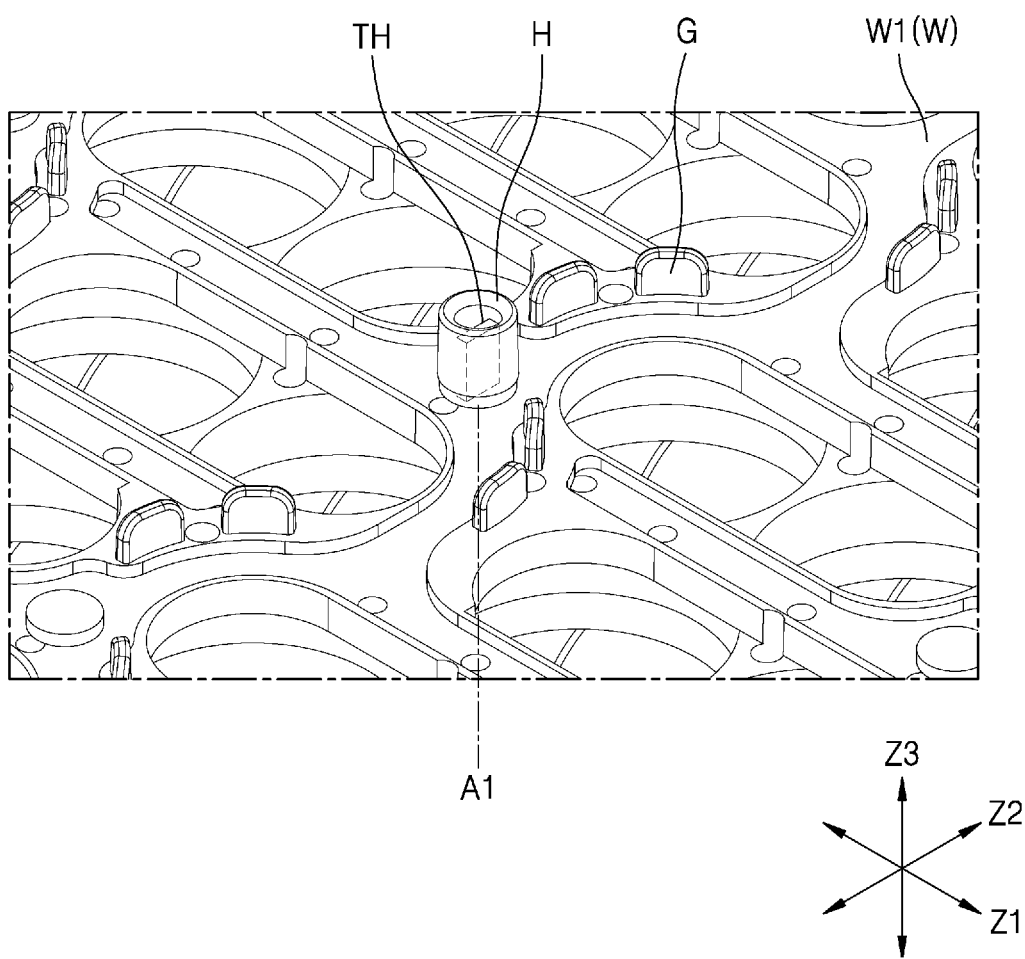
FIG. 8 is an enlarged perspective view of a part of an upper holder illustrated in FIG. 7.
Figure 9:
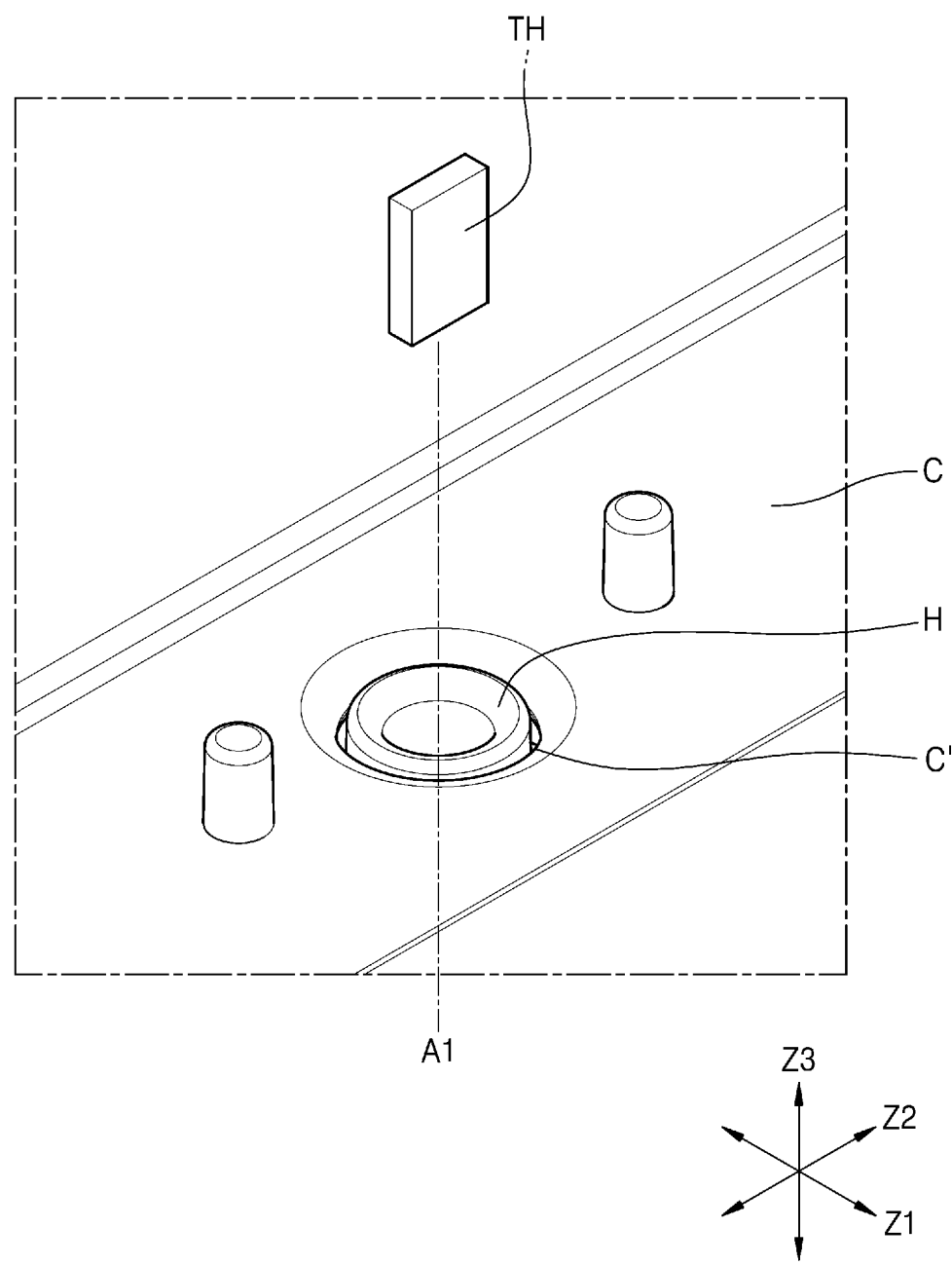
FIG. 9 is a perspective view illustrating a state in which a cover illustrated in FIG. 7 is assembled on the upper holder of FIG. 8.
Figure 10:
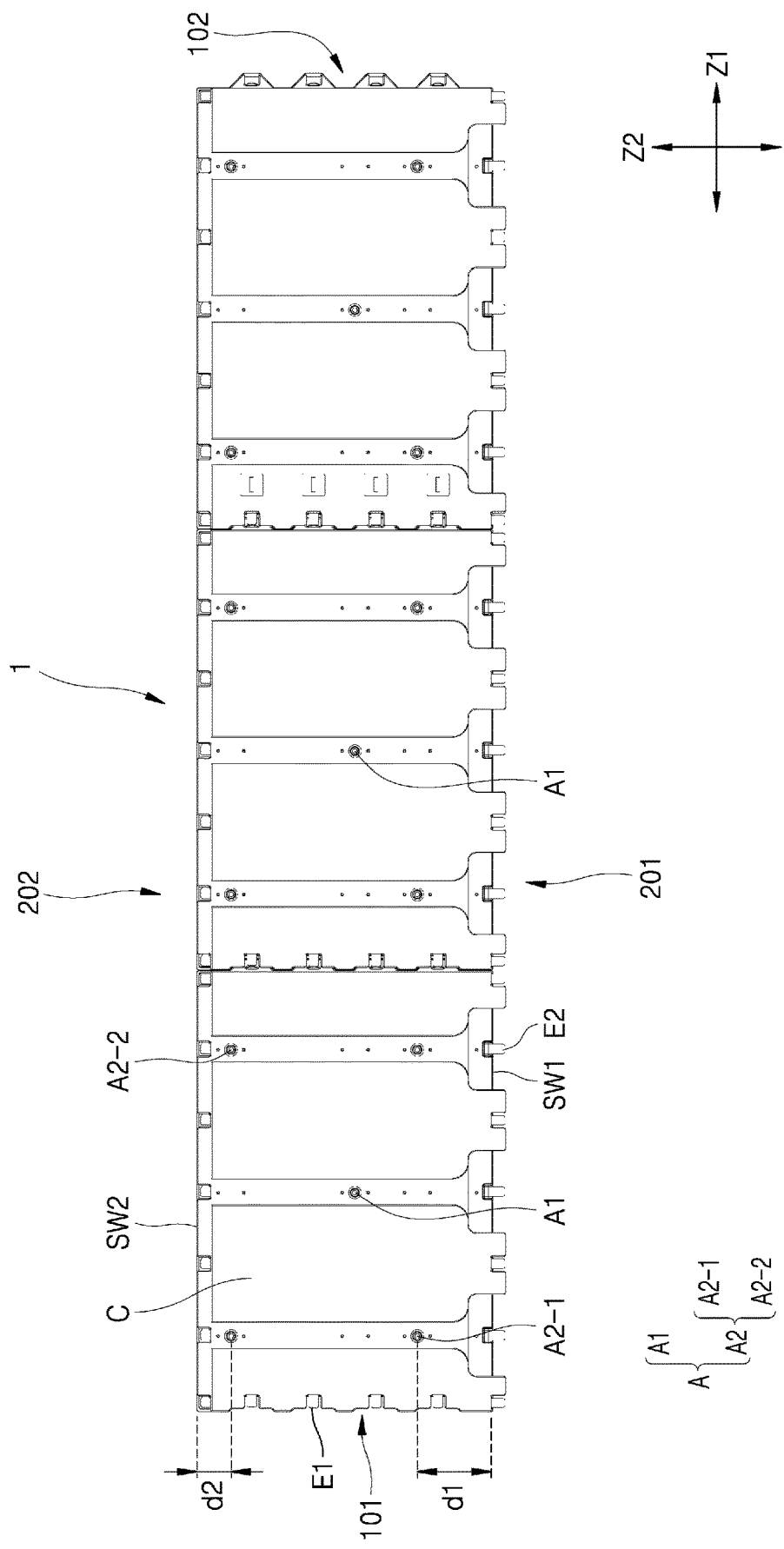
FIG. 10 is a plan view showing an arrangement of thermistors in a module in which a battery pack is expanded in a row direction.
Figure 11:
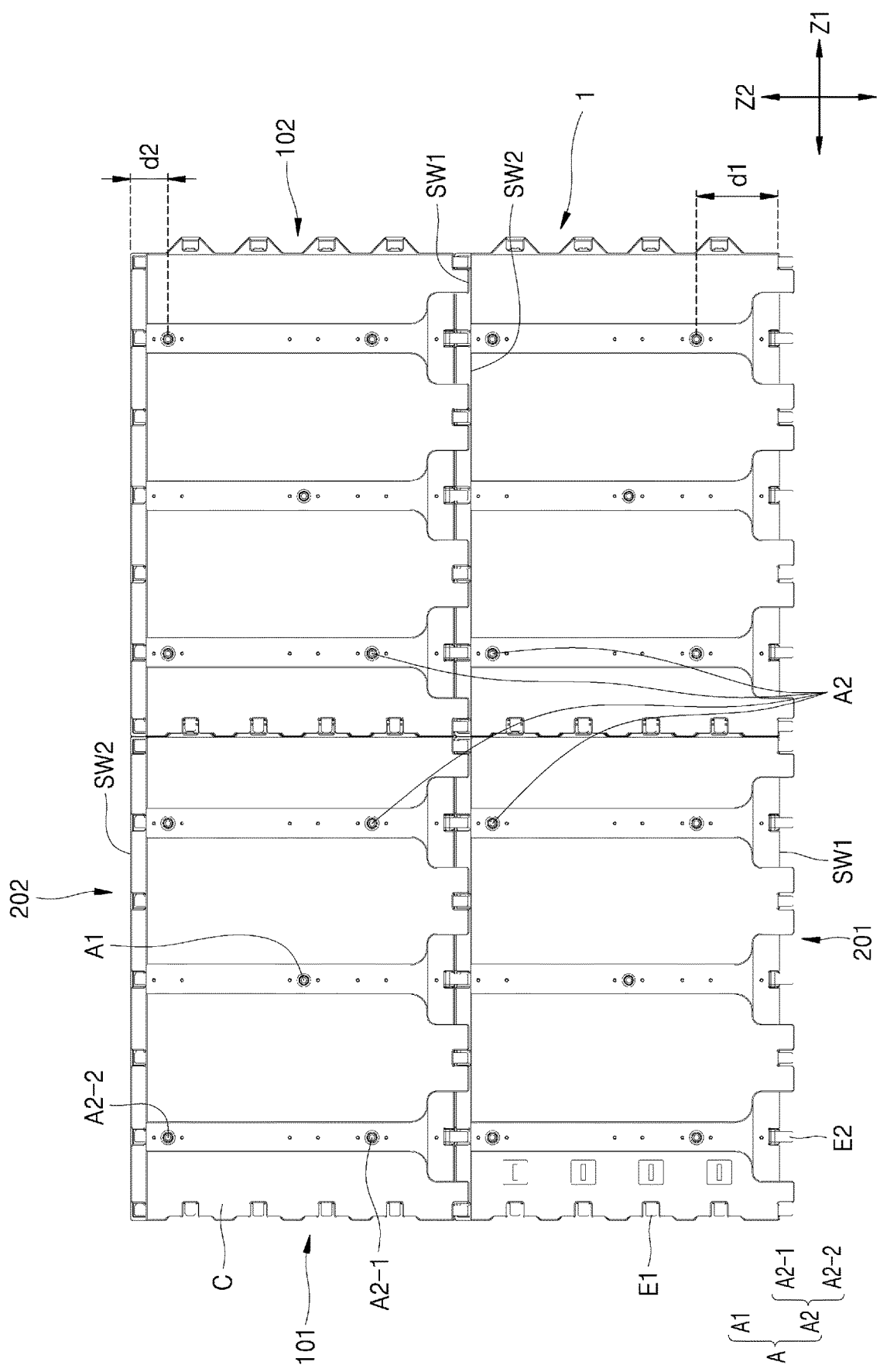
FIG. 11 is a plan view showing an arrangement of thermistors in a module in which a battery pack is expanded in row and column directions.

FIG. 7 is an exploded perspective view of a battery pack according to an embodiment. FIG. 8 is an enlarged perspective view of a part of an upper holder illustrated in FIG. 7. FIG. 9 is a perspective view illustrating a state in which a cover illustrated in FIG. 7 is assembled on the upper holder illustrated in FIG. 8. FIG. 10 is a plan view of an arrangement of thermistors in a module in which a battery pack is expanded in a row direction. FIG. 11 is a plan view of an arrangement of thermistors in a module in which a battery pack is expanded in row and column directions.

Hereinafter, an arrangement structure of thermistors TH for detecting the temperature of the battery cells 10 according to an embodiment will be described with reference to FIGS. 7 to 11. In an embodiment, the cell holder W may include a hollow protrusion H protruding in the height direction Z3 crossing (e.g., intersecting) the row direction Z1 and the column direction Z2, and an exposure hole C' for exposing the hollow protrusion H may be formed in a cover C arranged on the cell holder W. In addition, the thermistor TH for detecting the temperature of the battery cells 10 may be accommodated in the hollow protrusion H through the exposure hole C'.

The hollow protrusion H may have an empty space therein to accommodate the thermistor TH and may protrude in the height direction Z3 such that the thermistor TH is accommodated in the hollow protrusion H from above the cell holder W in the height direction Z3. For example, the hollow protrusion H may include a sidewall having an annular shape surrounding (e.g., extending around) a central hollow in which the thermistor TH is accommodated, and in various embodiments, the hollow protrusion H may be formed in any shape other than an annular shape surrounding the central hollow in which the thermistor TH is accommodated.

The hollow protrusion H may accommodate the thermistor TH for detecting the temperature of the battery cells 10 through the central hollow, and the position of the hollow protrusion H may correspond to the position of the thermistor TH accommodated in the hollow protrusion H or a temperature detection position A at which the temperature of the battery cells 10 is detected by using the thermistor TH. Throughout the specification, the position of the hollow protrusion H, the position of the thermistor TH, and the temperature detection position A may all correspond to substantially the same position and may respectively refer to the position of the hollow protrusion H, the position of the thermistor TH arranged in the hollow protrusion H, and the temperature detection position A of the battery cells 10 at which the temperature of the battery cells 10 is detected by using the thermistor TH on the plane formed by the row direction Z1 and the column direction Z2. Hereinafter, the temperature detection position A on the plane of the cell holder W will be described in more detail. Throughout the specification, the plane of the cell holder W may refer to a plane of the cell holder W formed by the row direction Z1 and the column direction Z2, and the temperature detection position A may be defined on the plane of the cell holder W.

In an embodiment, the temperature detection positions A may include a first temperature detection position A1 formed at a central position on the plane of the cell holder W and second temperature detection positions A2 adjacent to corner positions other than to the central position. In an embodiment, the second temperature detection positions A2 may be adjacent to the corner positions and may correspond to positions spaced apart from the front walls FW, the rear walls RW, or the first and second sidewalls SW1 and SW2 forming the corner positions. For example, the cell holder W may include four corner positions at where the front walls FW or the rear walls RW extending in the row direction Z1, and the first or second sidewall SW1 or SW2 extending in the column direction Z2, contact each other and a total of four second temperature detection positions A2 adjacent to the respective four corner positions.

In an embodiment, the central position may be comprehensively defined to include the center of the cell holder W in the row direction Z1 and the column direction Z2 and positions adjacent to the center. The cell holder W may include the front walls FW and the rear walls RW facing each other in the row direction Z1 and the first and second sidewalls SW1 and SW2 facing each other in the column direction Z2, and the corner positions may be comprehensively defined to include corners at where the front walls FW, the rear walls RW, the first and second sidewalls SW1 and SW2 contact each other and positions adjacent to the corners.

In an embodiment, the temperature of the battery cells 10 arranged in the central position of the cell holder W may be detected at the first temperature detection position A1, and the temperature of the battery cells 10 arranged adjacent to the corner positions of the cell holder W may be detected at the second temperature detection positions A2. In an embodiment, the temperature detection positions A may include one first temperature detection position A1 formed at the central position and four second temperature detection positions A2 formed at four corner positions for a total of five temperature detection positions A. In an embodiment, temperature information of the central position and the corner positions of the cell holder W or four positions adjacent to the corner positions of the cell holder W may be obtained from a total of five first and second temperature detection positions A1 and A2, and the overall temperature distribution on the plane of the cell holder W may be obtained from the first and second temperature detection positions A1 and A2. As will be described below, in the battery pack 1 or the module 100 expanded to include a plurality of battery packs 1, the central position corresponds to a position relatively far away from the outside of the battery pack 1 or the module 100 than the corner positions are and, thus, may be a relatively high-temperature region. Accordingly, the central position of the battery pack 1 or the module 100 is included in the temperature detection positions A for monitoring the central position, which is a relatively high-temperature region. In an embodiment, the first temperature detection position A1 may correspond to a central position in the battery pack 1 or the module 100 expanded to include a plurality of battery packs 1. For example, the first temperature detection position A1 may correspond to the central position in the battery pack 1, and referring to FIG. 10, in the module 100 expanded in the row direction Z1, the first temperature detection position A1 may correspond to a central position in the column direction Z2. As such, the first temperature detection position A1 may correspond to the central position in the battery pack 1 and the module 100 expanded to include a plurality of battery packs 1 in the row direction Z1, and thus, when a plurality of battery packs 1 including the first temperature detection position A1 are arranged in the row direction Z1 to constitute the module 100 expanded in the row direction Z1, the central position of the module 100 may be monitored through the first temperature detection positions A1 of the battery packs 1 without requiring selection of a separate additional temperature detection position A for monitoring the central position of the module 100.

The second temperature detection positions A2 are formed at positions adjacent to four corner positions and, in one battery pack 1, may correspond to positions adjacent to corner positions rather than to the central position. Referring to FIG. 11, in the module 100 expanded in the row direction Z1 and the column direction Z2, the second temperature detection positions A2 may correspond to central positions of the module 100. For example, in the module 100 expanded in the row direction Z1 and the column direction Z2 including, for example, a total of four battery packs 1 including two battery packs 1 adjacent to each other in the row direction Z1 and two battery packs 1 adjacent to each other in the column direction Z2, the second temperature detection positions A2 formed in the respective battery packs 1 may be gathered adjacent to the central position of the expanded module 100. Because the four second temperature detection positions A2 formed in the respective battery packs 1 are gathered together adjacent to the central position of the module 100, temperature information regarding the central position of the module 100 may be obtained through the second temperature detection positions A2 of the respective battery packs 1 gathered together adjacent to the central position of the module 100 without requiring selection of a separate temperature detection position A for monitoring the central position of the module 100 expanded in the row direction Z1 and the column direction Z2.

Regarding the second temperature detection positions A2 gathered together adjacent to the central position of the module 100 expanded in the row direction Z1 and the column direction Z2, the second temperature detection positions A2 formed adjacent to corner positions in one battery pack 1 may be arranged such that any second temperature detection position A2 is also adjacent to the central position of the expanded module 100 according to the position of each battery pack 1 in the module 100 expanded to include a plurality of battery packs 1. For example, when a plurality of battery packs 1 having the same structure are arranged to face each other in the row direction Z1 and the column direction Z2, from among the second temperature detection positions A2 formed in the respective battery packs 1, one or more second temperature detection positions A2 may be arranged adjacent to the central position in the expanded module 100 according to the position of arrangement of each battery pack 1.

In an embodiment, the first expansion edge 101 (corresponding to the front walls FW) and the first accommodation edge 102 (corresponding to the rear walls RW) may be arranged to face each other in the row direction Z1, and in one embodiment, the first expansion edge 101 (corresponding to the front walls FW) may correspond to the front walls FW, and the first accommodation edge 102 (corresponding to the rear walls RW) may correspond to the rear walls RW. In addition, in an embodiment, the second expansion edge 201 (corresponding to the first sidewall SW1) and the second accommodation edge 202 (corresponding to the second sidewall SW2) may be arranged to face each other in the column direction Z2, and in one embodiment, the second expansion edge 201 (corresponding to the first sidewall SW1) may correspond to the first sidewall SW1, and the second accommodation edge 202 (corresponding to the second sidewall SW2) may correspond to the second sidewall SW2. As such, in an embodiment, in the module 100 expanded in the row direction Z1 and the column direction Z2, the module 100 expanded in the row direction Z1 and the column direction Z2 may be provided in which the first expansion edge 101 (corresponding to the front walls FW) and the first accommodation edge 102 (corresponding to the rear walls RW) are arranged to face each other in the row direction Z1, and the second expansion edge 201 (corresponding to the first sidewall SW1) and the second accommodation edge 202 (corresponding to the second sidewall SW2) are arranged to face each other in the column direction Z2.

Referring to FIG. 7, in an embodiment, the second temperature detection positions A2 formed in the respective battery cells 10 may be arranged at asymmetrical positions between the second expansion edge 201 (corresponding to the first sidewall SW1) and the second accommodation edge 202 (corresponding to the second sidewall SW2) facing each other in the column direction Z2, and in an embodiment, four second temperature detection positions A2 may be formed at positions relatively biased toward the second accommodation edge 202 (corresponding to the second sidewall SW2) among the second expansion edge 201 (corresponding to the first sidewall SW1) and the second accommodation edge 202 (corresponding to the second sidewall SW2). In an embodiment, because the second temperature detection positions A2 are asymmetrically arranged at positions biased toward any one side, for example, toward the second accommodation edge 202 (corresponding to the second sidewall SW2), and between the second expansion edge 201 (corresponding to the first sidewall SW1) and the second accommodation edge 202 (corresponding to the second sidewall SW2), more various monitoring locations of the temperature distribution of the battery pack 1 may be provided. In an embodiment, because the second temperature detection positions A2 are asymmetrically arranged, the overall temperature distribution of the battery pack 1 may be more precisely monitored even through a limited number of temperature detection positions A, and for example, the temperature distribution for eight positions may be calculated or estimated by symmetrically spreading out four second temperature detection positions A2 formed at asymmetric positions on the plane of the cell holder W.

In an embodiment, the second temperature detection positions A2 may be formed at positions biased toward the second accommodation edge 202 (corresponding to the second sidewall SW2) between the second expansion edge 201 (corresponding to the first sidewall SW1) and the second accommodation edge 202 (corresponding to the second sidewall SW2). For example, the second temperature detection positions A2 may include a 2-1 st temperature detection position A2-1 formed adjacent to the second expansion edge 201 (corresponding to the first sidewall SW1) and a 2-2nd temperature detection position A2-2 formed adjacent to the second accommodation edge 202 (corresponding to the second sidewall SW2). In such an embodiment, a first distance d1 between the second expansion edge 201 (corresponding to the first sidewall SW1) and the 2-1st temperature detection position A2-1 may be greater than a second distance d2 between the second accommodation edge 202 (corresponding to the second sidewall SW2) and the 2-2nd temperature detection position A2-2. In an embodiment, the 2-1st temperature detection positions A2-1 may include two 2-1st temperature detection positions A2-1 spaced apart from each other in the row direction Z1 and arranged along the second expansion edge 201 (corresponding to the first sidewall SW1), and the 2-2nd temperature detection positions A2-2 may include two 2-2nd temperature detection positions A2-2 spaced apart from each other in the row direction Z1 and arranged along the second accommodation edge 202 (corresponding to the second sidewall SW2).

Referring to FIG. 11, in an embodiment, the second temperature detection positions A2 formed at asymmetric positions in the respective battery packs 1 may be formed at asymmetrical positions even in the module 100 expanded in the row direction Z1 and the column direction Z2, and for example, the second temperature detection positions A2 in the expanded module 100 may be formed at asymmetrical positions between the second expansion edge 201 (corresponding to the first sidewall SW1) and the second accommodation edge 202 (corresponding to the second sidewall SW2). For example, in the module 100 including four battery packs 1, each having four second temperature detection positions A2 formed therein, a total of 16 second temperature detection positions A2 may be arranged at positions biased toward the second accommodation edge 202 (corresponding to the second sidewall SW2) between the second expansion edge 201 (corresponding to the first sidewall SW1) and the second accommodation edge 202 (corresponding to the second sidewall SW2) forming the outer periphery of the module 100 in the column direction Z2. In the module 100 including four battery packs, a total of 16 second temperature detection positions A2 are arranged at positions biased toward the second accommodation edge 202 (corresponding to the second sidewall SW2) between the second expansion edge 201 (corresponding to the first sidewall SW1) and the second accommodation edge 202 (corresponding to the second sidewall SW2) forming the outer periphery of the module 100 in the column direction Z2 may mean that a total of 16 second temperature detection positions A2 with respect to the central positions of the respective battery packs 1 are arranged at positions relatively biased toward the second accommodation edge 202 (corresponding to the second sidewall SW2) from among the second accommodation edge 202 (corresponding to the second sidewall SW2) and the second expansion edge 201 (corresponding to the first sidewall SW1) forming the outer periphery of the module 100.

In an embodiment, more precise temperature distribution may be obtained with respect to the central position or the vicinity of the central position of the expanded module 100 by the second temperature detection positions A2 formed at asymmetrical positions in the respective battery packs 1. For example, in an embodiment, as the second temperature detection positions A2 formed in the respective battery packs 1 are formed at asymmetrical positions, an issue that, in the expanded module 100, a total of four second temperature detection positions A2 formed in different battery packs 1 are too close to the central position of the module 100 and, thus, substantially redundant temperature measurement is made may be overcome or the second temperature detection positions A2 are too far from the central position and, thus, temperature measurement is not performed with respect to the central position may be prevented. For example, in an embodiment, assuming that the expanded module 100 is provided in which the second expansion edge 201 (corresponding to the first sidewall SW1) and the second accommodation edge 202 (corresponding to the second sidewall SW2) of battery packs 1 adjacent to each other in the column direction Z2 face each other, the second temperature detection positions A2 of the battery pack 1 having the second accommodation edge 202 (corresponding to the second sidewall SW2) facing the second expansion edge 201 (corresponding to the first sidewall SW1) of the opposite battery pack 1 may enable detection of the temperature at positions closer to the central position of the module 100, and the second temperature detection positions A2 of the battery pack 1 having the second expansion edge 201 (corresponding to the first sidewall SW1) facing the second accommodation edge 202 (corresponding to the second sidewall SW2) of the opposite battery pack 1 may enable detection of the temperature at positions relatively far from the central position of the module 100.

In an embodiment, the second temperature detection positions A2 may be formed at positions relatively biased toward the second accommodation edge 202 (corresponding to the second sidewall SW2) rather than toward the second expansion edge 201 (corresponding to the first sidewall SW1), and in various embodiments, the second temperature detection positions A2 may be arranged at positions biased toward the second expansion edge 201 (corresponding to the first sidewall SW1) rather than toward the second accommodation edge 202 (corresponding to the second sidewall SW2), or the second temperature detection positions A2 may not be formed at asymmetrical positions between the second expansion edge 201 (corresponding to the first sidewall SW1) and the second accommodation edge 202 (corresponding to the second sidewall SW2) facing each other in the column direction Z2 but may be formed at asymmetrical positions between the first expansion edge 101 (corresponding to the front walls FW) and the first accommodation edge 102 (corresponding to the rear walls RW) facing each other in the row direction Z1. In various embodiments, the second temperature detection positions A2 may be formed at symmetrical positions on the plane of the cell holder W, for example, may be formed at symmetrical positions between the second expansion edge 201 (corresponding to the first sidewall SW1) and the second accommodation edge 202 (corresponding to the second sidewall SW2) facing each other in the column direction Z2 and may also be formed at symmetrical positions between the first expansion edge 101 (corresponding to the front walls FW) and the first accommodation edge 102 (corresponding to the rear walls RW) facing each other in the row direction Z1.

Referring to FIGS. 7 to 9, in an embodiment, the thermistor TH for measuring the temperature of the battery cells 10 may be arranged at the temperature detection position A. For example, the thermistor TH may be accommodated in the hollow protrusion H formed in the cell holder W and may be accommodated in a hollow surrounded by the hollow protrusion H. The hollow protrusion H may protrude from the body of the cell holder W in the height direction Z3, and a guide piece G may be formed in the main body of the cell holder W, together with the hollow protrusion H. The guide piece G may protrude from the body of the cell holder W in the height direction Z3 to fix the position of the busbar B and may regulate the assembly position of the busbar B assembled from above the cell holder W. Because the contours of the guide piece G of the cell holder W and the busbar B physically interfere with each other, the position of the busbar B may be regulated and the busbar B may not move on the plane of the cell holder W. In an embodiment, similar to the guide piece G, the hollow protrusion H protruding in the height direction Z3 from the body of the cell holder W may also regulate the assembly position of the busbar B on the cell holder W, and for example, when an assembly hole formed in the busbar B is fitted into the hollow protrusion H formed on the cell holder W, the correct position of the busbar B may be more firmly maintained. The hollow protrusion H and the guide piece G may form physical interference with the body portion B1 of the busbar B, and to this end, the hollow protrusion H and the guide piece G may be formed at positions at which the body portion B1 of the busbar B is arranged. In an embodiment, the body portion B1 of the busbar B may be arranged between groups of battery cells 10g (parallel groups) adjacent to each other in the row direction Z1, and accordingly, the hollow protrusion H and the guide piece G may be formed at positions between the groups of battery cells 10g (parallel groups) adjacent to each other on the plane of the cell holder W.

In an embodiment, because the position of the hollow protrusion H corresponds to the temperature detection position A at which the thermistor TH is arranged, the temperature detection positions A may be formed between groups of battery cells 10g (parallel groups) adjacent to each other in the row direction Z1, and in more detail, may be formed between two pairs of battery cells 10 adjacent to each other in the row direction Z1, that is, between four battery cells 10 adjacent to each other in the row direction Z1. When the hollow protrusion H is formed at the temperature detection position A between the battery cells 10 adjacent to each other, the thermistor TH accommodated in the hollow protrusion H measures the temperature between adjacent battery cells 10 rather than measuring the temperature of a particular battery cell 10.

Manufacturing of the battery pack 1 according to an embodiment may be performed as follows. The busbars B and the connection members 50 (see, e.g., FIG. 16) are arranged on the cell holder W in which the battery cells 10 are assembled, and a potting resin may be applied on the cell holder W in which the busbars B and the connection members 50 are arranged. The potting resin may protect the connection members 50 arranged in the cell holder W and may protect bonding portions of the connection members 50 formed at the busbars B and upper end of the battery cells 10 connected to the connection members 50. The potting resin is applied on the cell holder W in which the busbars B and the connection members 50 are arranged, and the inside of the hollow protrusion H protruding in the height direction Z3 from the body of the cell holder W, that is, the hollow surrounded by the hollow protrusion H, may not be filled with the potting resin. For example, the hollow protrusion H may surround the hollow in which the thermistor TH is arranged to protect the hollow in which the thermistor TH is assembled and may exclude the potting resin from the inside of the hollow to prevent assembly of the thermistor TH inserted into the hollow from being hindered.

As such, the cover C may be arranged on the cell holder W to which the potting resin is applied, the hollow protrusion H of the cell holder W may be exposed to the outside of the cover C through the exposure hole C' of the cover C, and the thermistor TH may be accommodated in the hollow protrusion H exposed to the outside of the cover C through the exposure hole C' of the cover C. For example, in the manufacture of the battery pack 1 according to an embodiment, the assembly of the thermistor TH may be performed in the final stage, and because, in an intermediate stage for the manufacture of the battery pack 1, there is no need for separate consideration for assembling the thermistor TH, and the assembly of the thermistor TH is performed in the final stage through a simple process of assembling the thermistor TH to the hollow protrusion H exposed on the cover C, the manufacture of the battery pack 1 may be simplified, and the convenience of the manufacturing processes may be improved.

Referring to FIG. 9, the height of the hollow protrusion H may be designed to be substantially equal to or less than the height formed by the outer surface of the cover C. When the hollow protrusion H protrudes from the outer surface of the cover C, the hollow protrusion H protruding from the outer surface of the battery pack 1 may not be protected from external impact, and thus, the cover C may not substantially function or may poorly function.

Referring to FIGS. 1 to 3, in an embodiment, an upper portion of the battery cell 10 in the height direction Z3 may be assembled to an upper holder W1, and the lower portion of the battery cell 10 may be assembled to a lower holder W2. At this time, the position fixation between the upper portion of the battery cell 10 and the upper holder W1 may be performed by adhesion of an adhesive, and the position fixation between the lower portion of the battery cell 10 and the lower holder W2 may be performed by press-fitting. In an embodiment, an electrical connection between the upper end of the battery cell 10 (e.g., the electrodes 11 and 12 formed on the upper end) and the busbar B may be made through the connection member 50 and, because the connection member 50 may be provided as a flexible member, such as a conductive wire or a conductive ribbon, damage to the connection member 50 connected between the upper end of the battery cell 10 and the busbar B may be prevented by suppressing the rotation of an upper portion or the upper end of the battery cell 10 through robust position fixation through adhesion between the upper portion of the battery cell 10 and the upper holder W1. For example, the connection member 50, which is between the upper end of the battery cell 10 (e.g., the electrodes 11 and 12 formed on the upper end) and the busbar B and connects them to each other, has one end bonded to the upper end of the battery cell 10 (e.g., the electrodes 11 and 12 formed on the upper end) and the other end bonded to the busbar B and, thus, may form the electrical connection between the upper end of the battery cell 10 and the busbar B through the one end bonded to the upper end of the battery cell 10 and the other end bonded to the busbar B. In an embodiment, the connection member 50 may be provided as a conductive wire or a conductive ribbon, and the bonding of the connection member 50 may be performed through wire bonding or ribbon bonding.

In an embodiment, the upper end and the lower end of the battery cell 10 in the height direction Z3 may be assembled while being exposed to the outside from (or by) the upper holder W1 and the lower holder W2, respectively. In more detail, in a state in which the upper end of the battery cell 10 is exposed from the upper holder W1, an electrical connection may be made between the electrodes 11 and 12 formed at the upper end of the battery cell 10 and the busbar B, and in a state in which the lower end of the battery cell 10 is exposed from the lower holder W2, cooling of the battery cell 10 may be made through the lower end of the battery cell 10. In other words, the upper end of the battery cell 10 exposed from the upper holder W1 may form an electrical connection with the busbar B, and the lower end of the battery cell 10 exposed from the lower holder W2 may form a thermal contact with a cooling plate 70 (see, e.g., FIG. 1). Throughout the specification, that the upper portion of the battery cell 10 in the height direction Z3 is fitted into the upper holder W1 and the lower portion of the battery cell 10 is fitted into the lower holder W2 may mean, for example, that the upper portion of the battery cell 10 adjacent to the upper end of the battery cell 10 and the lower portion of the battery cell 10 adjacent to the lower end of the battery cell 10 fix the upper portion and the lower portion of the battery cell 10 while forming a physical interference with the upper holder W1 and the lower holder W2, respectively. For example, the upper portion of the battery cell 10 may refer to a position between the upper end and the middle of the battery cell 10 in the height direction Z3, and the lower portion of the battery cell 10 may refer to a position between the lower end and the middle of the battery cell 10 in the height direction Z3.

In an embodiment, assembly between the battery cell 10 and the cell holder W may be performed as follows. First, after applying an adhesive on the upper portion of the battery cell 10, the upper portion of the battery cell 10 may be assembled by fitting it into the upper holder W1 in a state in which the upper holder W1 is placed upside down. Here, that the upper portion of the battery cell 10 is assembled by fitting it into the upper holder W1 in a state in which the upper holder W1 is placed upside down may mean that the battery cell 10 is assembled from the lower surface of the upper holder W1 toward the upper surface, and the lower surface and the upper surface of the upper holder W1 are opposite to each other in the upper holder W1, and may refer to a surface opposite to the cover C and a surface facing the cover C, respectively. Here, in a state in which the adhesive is applied to the upper portion of the battery cell 10, position fixation between the upper portion of the battery cell 10 and the upper holder W1 may be performed by using the adhesive by fitting and assembling the upper portion of the battery cell 10 to which the adhesive is applied, into the upper holder W1.

Thereafter, the lower holder W2 may be assembled toward the battery cell 10 fitted into the upper holder W1. For example, the lower holder W2 may fix the position of the lower portion of the battery cell 10 while being press-fitted with the lower portion of the battery cell 10. In an embodiment, the lower holder W2 may be assembled in a direction from the lower end toward the upper end of the battery cell 10, and in the specification, that the battery cell 10 is assembled toward the lower holder W2 may include that the lower holder W2 is assembled toward the battery cell 10 because the assembly direction between the lower holder W2 and the battery cell 10 is the same as the direction toward each other. In an embodiment, assembly between the cell holder W and the battery cell 10 may be performed in a state in which the cell holder W and the battery cell 10 are upside down, and for example, in a state in which the upper holder W1 of the cell holder W is upside down, the battery cell 10, the upper portion of which is applied with the adhesive is fitted and assembled into the upper holder W1, and in a state in which the upper holder W1 and the battery cell 10 fitted into the upper holder W1 are upside down, the lower holder W2 may be fitted and assembled into the lower portion of the battery cell 10. Throughout the specification, that the assembly between the cell holder W and the battery cell 10 is performed in a state in which the cell holder W and the battery cell 10 are upside down may mean, for example, that, with the orientation of the battery pack 1 as illustrated in FIG. 1, in a state in which the positions of the upper and lower portions are inverted with respect to each other in the height direction Z3, the assembly between the cell holder W and the battery cell 10 is performed, and may mean, for example, that the cell holder W and the battery cell 10 are assembled in a state in which the cell holder W and the battery cell 10 are upside down such that the busbar B arranged at an upper position of the battery pack 1, the upper holder W1 supporting the busbar B, or the upper end of the battery cell 10 forming the electrical connection with the busbar B is placed at a relatively lower position.

Referring to FIGS. 1 to 3, in an embodiment, a plurality of battery cells 10 may be assembled to the cell holder W, and the cell holder W may include the upper holder W1 and the lower holder W2 that are arranged at different upper and lower positions in the height direction Z3, respectively. Throughout the specification, that the upper holder W1 and the lower holder W2 are arranged at upper and lower positions in the height direction Z3, respectively, may mean that that the upper holder W1 and the lower holder W2 are arranged at different levels in the height direction Z3 of the battery cell 10, and the upper position and the lower position of the battery cell 10 refer to different levels in the height direction Z3 of the battery cell 10, and for example, may refer to a position relatively close to the busbar B and a position relatively far from the busbar B in the height direction Z3 of the battery cell 10, respectively. The height direction Z3 or the height direction Z3 of the battery cell 10 refers to a direction crossing (e.g., intersecting) the row direction Z1 and the column direction Z2, and in an embodiment, the height direction Z3 may refer to a direction perpendicular to the row direction Z1 and the column direction Z2. For example, the height direction Z3 may correspond to the longitudinal direction of the battery cell 10 or a direction in which the upper holder W1 and the lower holder W2 face each other and are assembled with each other.

Throughout the specification, the body of the cell holder W may refer to the body of the upper holder W1 or the body of the lower holder W2, and the main body of the upper holder W1 or the main body of the lower holder W2 may include a main surface W1m of the upper holder W1 or a main surface W2m of the lower holder W2. For example, throughout the specification, that the guide piece G and the hollow protrusion H protrude in the height direction Z3 from the body of the cell holder W may mean that the guide piece G and the hollow protrusion H protrude in the height direction Z3 from the body of the upper holder W1, and in more detail, may mean that the guide piece G and the hollow protrusion H protrude in the height direction Z3 from the body of the upper holder W1, that is, the main surface W1m of the upper holder W1 on which the busbar B is seated. Similarly, throughout the specification, that a protrusion P protrudes in the height direction Z3 from the body of the cell holder W may mean that the protrusion P protrudes in the height direction Z3 from the body of the lower holder W2, and in more detail, may mean that the protrusion P protrudes in the height direction Z3 from the body of the lower holder W2, that is, the main surface W2m of the lower holder W2 on which a rim portion L surrounding (or extending around) the outer periphery of the battery cell 10 is formed. The lower holder W2 including the protrusion P and the rim portion L will be described below in more detail.

The guide piece G for aligning the position of the busbar B and the hollow protrusion H for accommodating the thermistor TH may be formed in the upper holder W1, and the guide piece G and the hollow protrusion H may protrude in the height direction Z3 from the body of the cell holder W, that is, the body of the upper holder W1. In addition, the rim portion L surrounding the outer periphery of the battery cell 10 and the protrusion P protruding in the height direction Z3 from the rim portion L may be formed in the lower holder W2 coupled to the upper holder W1 to face the upper holder W1 in the height direction Z3.

Figure 12:
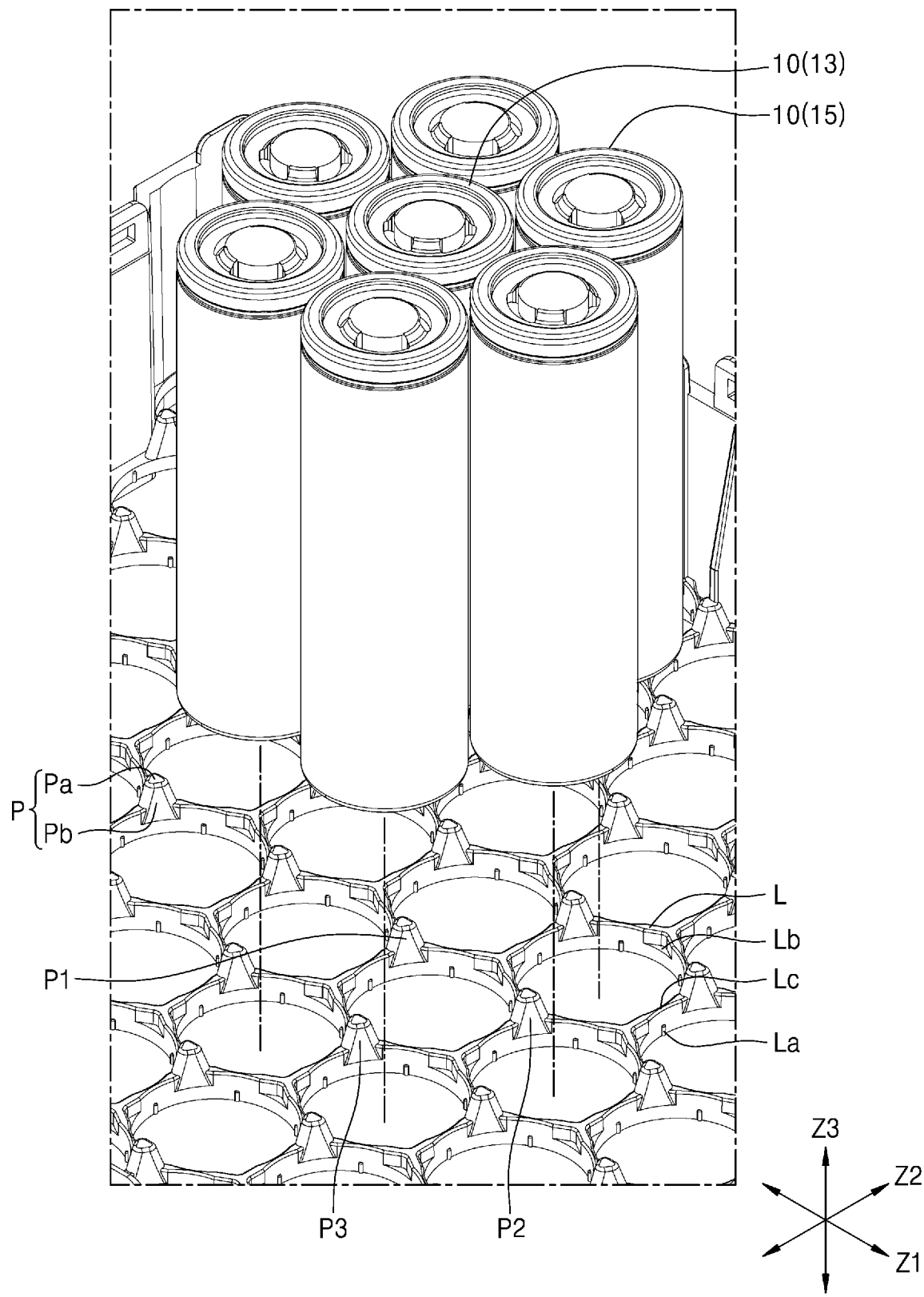
FIG. 12 is a perspective view showing an assembly between a battery cell and a lower holder.
Figure 13:
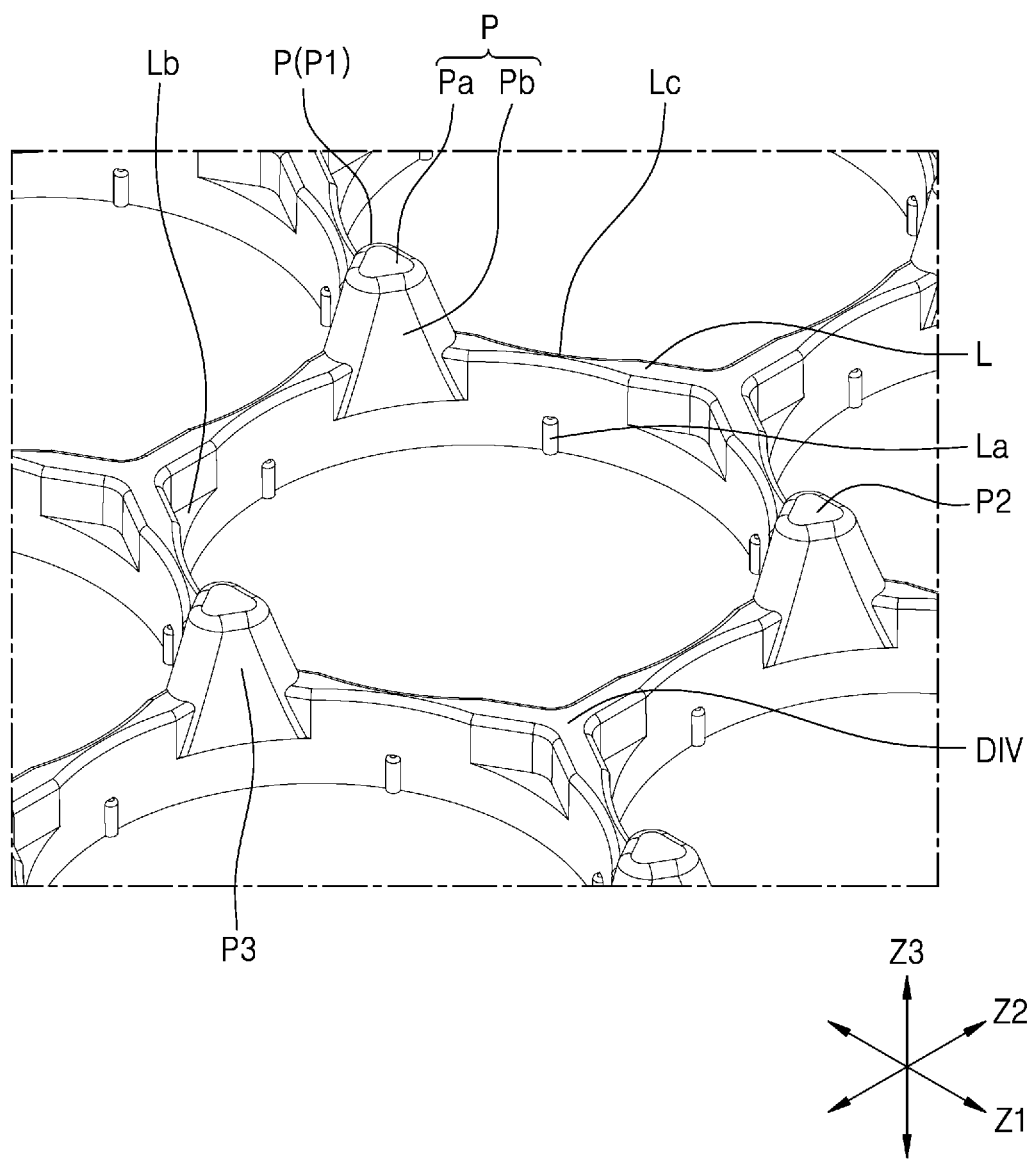
FIG. 13 is a perspective view of the lower holder illustrated in FIG. 12.
Figure 14:
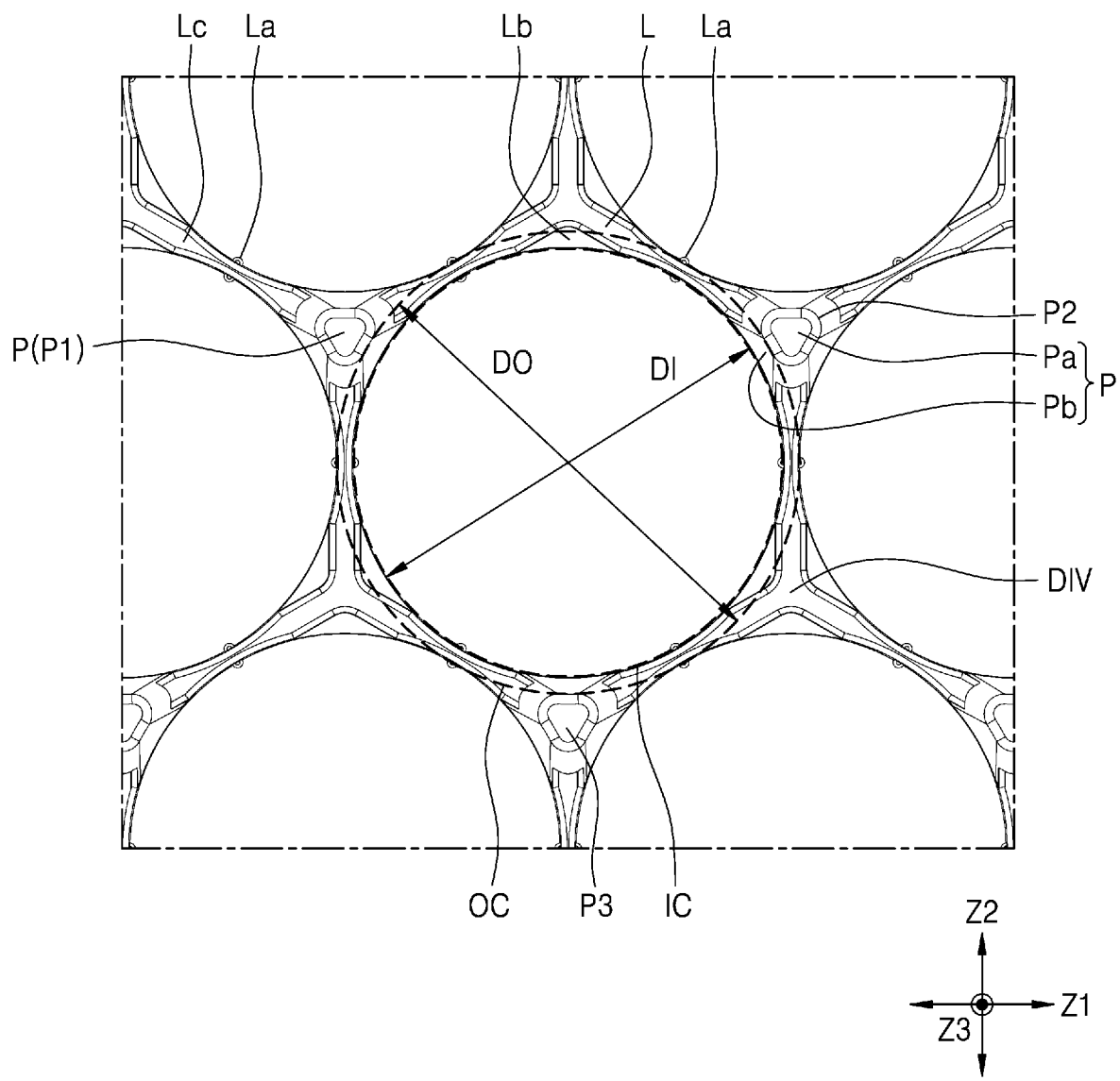
FIG. 14 is a plan view of the lower holder illustrated in FIGS. 12 and 13.
Figure 15:
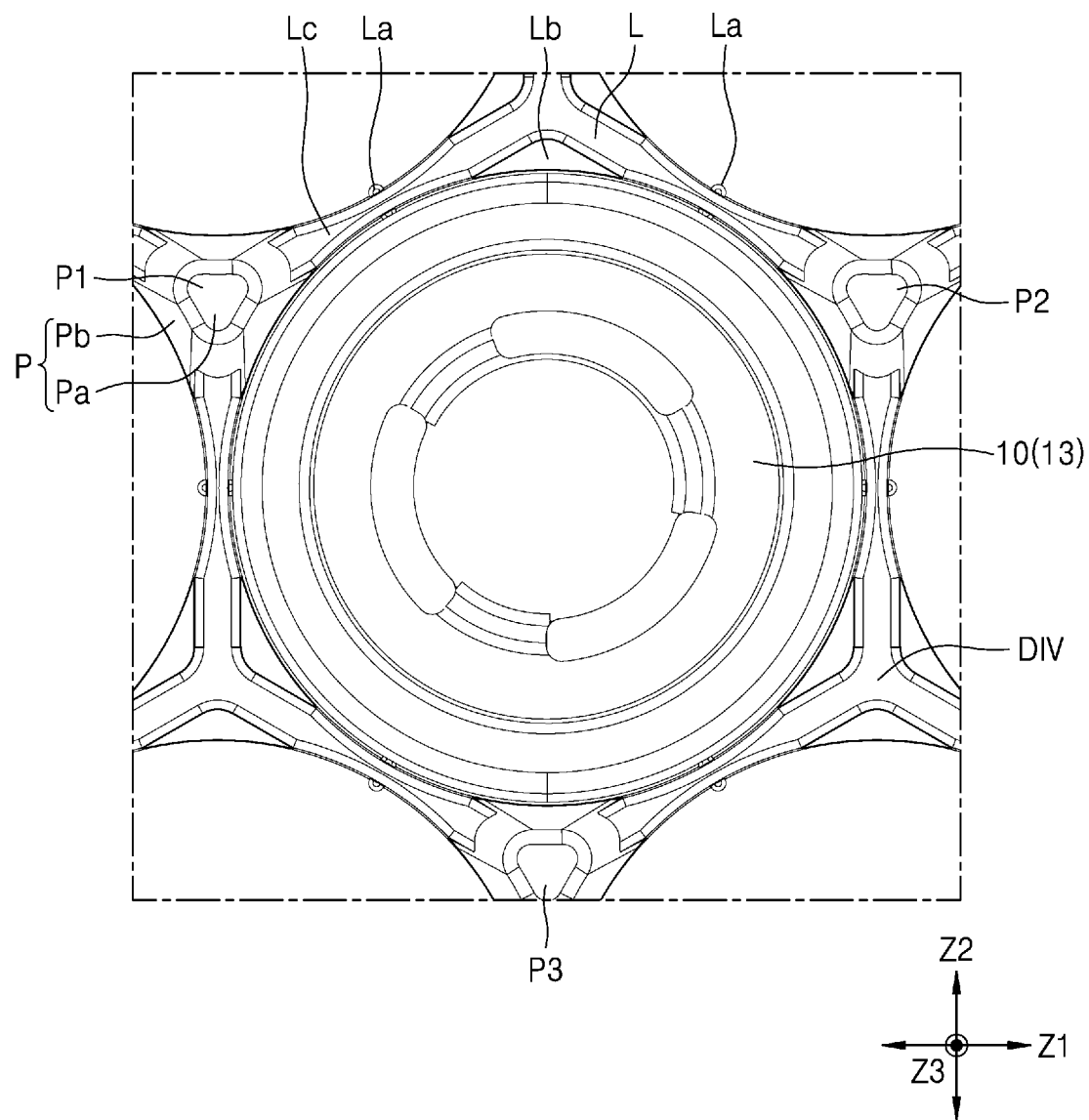
FIG. 15 is a plan view illustrating a lower holder with a battery cell installed therein.
Figure 16:
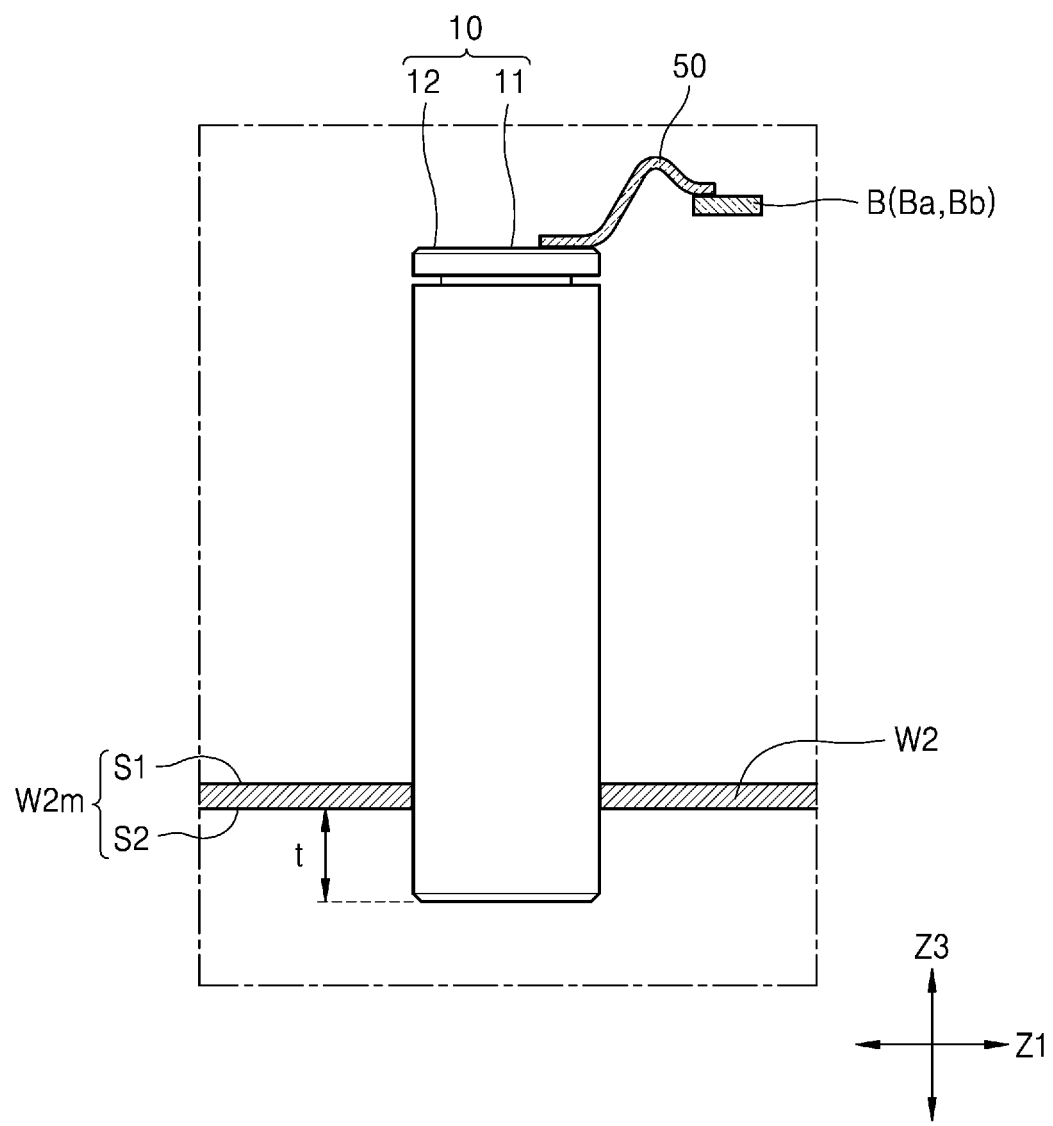
FIG. 16 is a diagram illustrating a side of the lower holder and battery cell illustrated in FIG. 15 viewed in a row direction or a column direction.

FIG. 12 is a perspective view for describing assembly between a battery cell and a lower holder. FIG. 13 is a perspective view illustrating the lower holder illustrated in FIG. 12. FIG. 14 is a plan view illustrating the lower holder illustrated in FIG. 13. FIG. 15 is a plan view illustrating a lower holder in which a battery cell is assembled. FIG. 16 is a diagram illustrating a side of the lower holder illustrated in FIG. 15 in which the battery cell is assembled viewed in the row direction or the column direction.

Referring to the drawings, in the lower holder W2, the rim portion L surrounding (or extending around) the outer periphery of the battery cell 10 and a plurality of protrusions P formed at different position along the rim portion L and protruding from the rim portion L in the height direction Z3 opposite to the assembly direction of the battery cell 10 may be formed. In an embodiment, the protrusions P may include first to third protrusions P1, P2, and P3 formed at three different positions along the rim portion L surrounding the outer periphery of any one of a plurality of battery cells 10, that is, a first battery cell 13. For example, six different satellite battery cells 15 may be arranged along (or around) the outer periphery of the first battery cell 13, and the first battery cell 13 may be surrounded by the six different satellite battery cells 15. In an embodiment, a plurality of rows of battery cells 10 arranged in the row direction Z1 may be arranged, and the battery cells 10 in rows adjacent to each other in the column direction Z2 crossing the row direction Z1 may be arranged to be shifted to a front position or a rear position in the row direction Z1 such that the battery cells 10 in one row are fitted into the valleys of the battery cells 10 in the other adjacent row to implement a dense arrangement of the battery cells 10. In such a dense arrangement of battery cells 10, six different satellite battery cells 15 may be arranged along the outer periphery of any one battery cell 10, that is, the first battery cell 13, the protrusions P may be formed between the first battery cell 13 and two satellite battery cells 15 adjacent to each other along the outer periphery of the first battery cell 13, and for example, the protrusions P may be arranged in valleys between the first battery cell 13 and two satellite battery cells 15 adjacent to each other along the outer periphery of the first battery cell 13. Throughout the specification, the valley may refer to, for example, a space formed between the outer circumferential surfaces of the cylindrical battery cells 10 adjacent to each other in a case in which the battery cells 10 are provided as cylindrical battery cells 10.

In an embodiment, six different satellite battery cells 15 may be arranged along the outer periphery of the first battery cell 13, and a total of six valleys may be formed between pairs of satellite battery cells 15 adjacent to each other along the outer periphery of the first battery cell 13 and between the satellite battery cells 15 and the first battery cell 13. In an embodiment, the protrusions P may be formed at alternating positions along the outer periphery of the first battery cell 13 from among a total of six valleys formed along the outer periphery of the first battery cell 13 rather than being formed in all six valleys along the outer periphery of the first battery cell 13. Thus, in some embodiments, a total of three protrusions P, that is, the first to third protrusions P1, P2, and P3, may be formed along the outer periphery of the first battery cell 13. In an embodiment, the protrusion P may include a protruding end Pa opposite to the rim portion L in the height direction Z3 and a side surface Pb connecting the rim portion L and the protruding end Pa to each other. The side surface Pb of the protrusion P may have a gradient in the assembly direction of the battery cell 10.

Referring to FIG. 14, in an embodiment, the first to third protrusions P1, P2, and P3 may be formed along the outer periphery of the first battery cell 13, and such an embodiment, the side surfaces Pb of the first to third protrusions P1, P2, and P3 may form circular traces OC and IC surrounding the first battery cell 13. For example, the side surfaces Pb of the first to third protrusions P1, P2, and P3 may face the outer circumferential surface of the first battery cell 13 at different positions along the outer periphery of the first battery cell 13 and may form the circular traces OC and IC surrounding the first battery cell 13 to induce assembly of the first battery cell 13. Here, the circular traces OC and IC formed by the side surfaces Pb of the first to third protrusions P1, P2, and P3 may be formed to have different diameters DO and DI in the height direction Z3. For example, the side surfaces Pb of the first to third protrusions P1, P2, and P3 may extend from the rim portion L forming the support base of the first to third protrusions P1, P2, and P3 to the respective protruding ends Pa, and the side surfaces Pb of the first to third protrusions P1, P2, and P3 may form the circular traces OC and IC having the diameters DO and DI that are gradually reduced from the first circular trace OC formed by the side surfaces Pb of the first to third protrusions P1, P2, and P3 in contact with the protruding ends Pa of the first to third protrusions P1, P2, and P3, to the second circular trace IC formed by the side surfaces Pb of the first to third protrusions P1, P2, and P3 in contact with the rim portion L. As such, because the side surfaces Pb of the first to third protrusions P1, P2, and P3 for inducing the assembly of the first battery cell 13 form the circular traces OC and IC that are gradually reduced in the assembly direction of the first battery cell 13, the first battery cell 13 may be assembled in a correct position through interference between the outer circumferential surface of the first battery cell 13 and the side surfaces Pb of the first to third protrusions P1, P2, and P3 accompanying the assembly of the first battery cell 13.

For example, the first to third protrusions P1, P2, and P3 may include the side surface Pb inclined with a gradient in the height direction Z3 and may include the side surface Pb inclined with a smooth gradient without steps. The side surfaces Pb of the first to third protrusions P1, P2, and P3 may form the circular traces OC and IC of the different diameters DO and DI at different levels in the height direction Z3. Throughout the specification, that the side surfaces Pb of the first to third protrusions P1, P2, and P3 form, in the height direction Z3, the circular traces OC and IC having the different diameters DO and DI may mean that, assuming the circular traces OC and IC continuously connecting the inner side surface Pb facing the outer circumferential surface of the first battery cell 13 from among the side surfaces Pb of the first to third protrusions P1, P2, and P3, the circular traces OC and IC may have the different (e.g., varying) diameters DO and DI in the height direction Z3.

In an embodiment, from among the side surfaces Pb of the first to third protrusions P1, P2, and P3, the diameter DO of the first circular trace OC formed by the side surfaces Pb of the first to third protrusions P1, P2, and P3 in contact with the respective protruding ends Pa may form a maximum value from among the diameters DO and DI of the circular traces OC and IC formed by the side surfaces Pb of the first to third protrusions P1, P2, and P3 in the height direction Z3. In addition, from among the side surfaces Pb of the first to third protrusions P1, P2, and P3, the diameter DI of the second circular trace IC formed by the side surfaces Pb of the first to third protrusions P1, P2, and P3 in contact with the rim portion L may form a minimum value from among the diameters DO and DI of the circular traces OC and IC formed by the side surfaces Pb of the first to third protrusions P1, P2, and P3 in the height direction Z3.

In an embodiment, the diameter DO of the first circular trace OC forming the maximum diameter DO and the diameter DI of the second circular trace IC forming the minimum diameter DI may be greater than the diameter of the first battery cell 13. The circular traces OC and IC formed by the side surfaces Pb of the first to third protrusions P1, P2, and P3 may be gradually reduced in the assembly direction of the first battery cell 13 to induce (e.g., to move) the first battery cell 13 to the correct position, and in such an embodiment, the second circular trace IC forming the minimum diameter DI may substantially correspond to the rim portion L forming a common support base of the first to third protrusions P1, P2, and P3. As will be described below, a contact protrusion La for forming press-fitting with the first battery cell 13 may be formed inside the rim portion L facing the outer circumferential surface of the first battery cell 13. That is, in an embodiment, the first to third protrusions P1, P2, and P3 may induce the first battery cell 13 to the correct position without needing to form press-fitting with the first battery cell 13, and accordingly, the minimum diameter DI formed by the side surfaces Pb of the first to third protrusions P1, P2, and P3, that is, the diameter DI of the second circular trace IC, may be greater than the diameter of the first battery cell 13. Thus, the first battery cell 13 is induced to the correct position through the side surface Pb of the first to third protrusions P1, P2, and P3 and may be fixed in position while forming press-fitting with the contact protrusion La formed inside the rim portion L facing the outer circumferential surface of the first battery cell 13.

The first battery cell 13 being assembled toward the rim portion L may be gradually induced to the correct position through the side surface Pb of the first to third protrusions P1, P2, and P3 surrounding the first battery cell 13, and accordingly, the first and second circular traces OC and IC formed by the side surfaces Pb of the first to third protrusions P1, P2, and P3 have diameters greater than the diameter of the first battery cell 13. For example, when the diameters DO and DI of the first and second circular traces OC and IC are less than or equal to the diameter of the first battery cell 13, it may be difficult for the first battery cell 13 to be fitted between the side surfaces Pb of the first to third protrusions P1, P2, and P3, and for example, the first battery cell 13 may not form press-fitting with the contact protrusion La protruding from the rim portion L forming the common support base of the first to third protrusions P1, P2, and P3 toward the outer circumferential surface of the first battery cell 13, and the assembly of the first battery cell 13 may be difficult due to the contact protrusion La.

In an embodiment, a plurality of protrusions P may be formed along the rim portion L surrounding the first battery cell 13, and the side surfaces Pb of the plurality of protrusions P facing the outer periphery of the first battery cell 13 may form a trace that is gradually changed in the height direction Z3. In an embodiment, the side surfaces Pb of the first to third protrusions P1, P2, and P3 facing the outer periphery of the first battery cell 13 may form the circular traces OC and IC, however, in various embodiments, the side surfaces Pb of the plurality of protrusions P facing the outer periphery of the first battery cell 13 may form other types of traces than the illustrated circular traces OC and IC. Throughout the specification, that the side surface Pb of the plurality of protrusions P facing the outer periphery of the first battery cell 13 forms a trace that gradually varies along the height direction Z3 may mean, for example, that a trace following the side surfaces Pb of the plurality of protrusions P on a plane perpendicular to the height direction Z3 gradually changes in the height direction Z3, and for example, a first trace formed by the side surfaces Pb of the plurality of protrusions P at a first level in the height direction Z3 and a second trace formed by the side surfaces Pb of the plurality of protrusions P at a second level different from the first level in the height direction Z3 may be different from each other, and as such, the traces formed at different levels in the height direction Z3 may guide the assembly of the first battery cell 13 to the correct position while the side surfaces Pb of the plurality of protrusions P form a gradient in the height direction Z3 to form a trace that is gradually changed in the height direction Z3.

Hereinafter, with reference to FIGS. 12 to 15, the shape of the rim portion L forming a common support base of the first to third protrusions P1, P2, and P3 will be described. In an embodiment, the rim portion L surrounding each of a plurality of battery cells 10 may form the main surface W2$m$ (see, e.g., FIG. 16) of the lower holder W2 while being connected to each other in a net shape. In an embodiment, the rim portions L surrounding the respective battery cells 10 adjacent to each other may be formed in a net shape while being connected to each other around a valley between the adjacent battery cells 10, and for example, the rim portions L respectively surrounding three adjacent battery cells 10 may all come into contact with each other in the valleys between the three adjacent battery cells 10 to form the rim portions L respectively surrounding the three battery cells 10 adjacent to each other while diverging in three different directions from the valley. For example, in an embodiment, in a valley between battery cells 10 adjacent to each other, a divergence point DIV in which the rim portions L respectively surrounding the adjacent battery cells 10 all come into contact with each other and diverge in different directions may be formed in a valley between the adjacent battery cells 10. For example, in a valley between three adjacent battery cells 10, the divergence point DIV may be formed in which the rim portions L respectively surrounding the three adjacent battery cells 10 all come into contact with each other and diverge in three different directions. As such, in an embodiment, in a valley between three battery cells 10 adjacent to each other, a divergence point DIV may be formed in which the rim portions L respectively surrounding the three adjacent battery cells 10 all come into contact with each other and diverge in three different directions, and the valleys or the divergence points DIV may be formed at six different positions in the outer circumferential direction of any one battery cell 10. For example, six different valleys or divergence points DIV may be formed in the outer circumferential direction of any one of a plurality of battery cells 10, that is, in the first battery cell 13. For example, six different satellite battery cells 15 may be arranged in the outer circumferential direction of the first battery cell 13, and a valley or a divergence point DIV may be formed between the first battery cell 13 and two satellite battery cells 15 adjacent to each other in the outer circumferential direction of the first battery cell 13, between their outer circumferential surfaces, in other words, a total of six valleys or divergence points DIV may be formed in the outer circumferential direction of the first battery cell 13. Throughout the specification, the valley may refer to a space formed between the outer circumferential surfaces of battery cells 10 adjacent to each other, and the divergence point DIV may refer to a point at which the rim portions L respectively surrounding the battery cells 10 adjacent to each other all come into contact with each other and diverge in three different directions when the rim portions L respectively surrounding the adjacent battery cells 10 are connected to each other in a net shape, and in an embodiment, the valley and the divergence point DIV may substantially correspond to the same position because the valley and the divergence point DIV refer to a position between three adjacent battery cells 10. That is, the valleys and the divergence points DIV may be formed at six different positions along the rim portion L surrounding each of the plurality of battery cells 10. For example, the valleys or the divergence points DIV may be formed at six different positions along the rim portion L surrounding any one of the plurality of battery cells 10, that is, the first battery cell 13, the first to third protrusions P1, P2, and P3 may be formed in three valleys or divergence points DIV corresponding to alternating positions from among a total of six valleys or divergence points DIV, and support portions Lb may be formed in the remaining three valleys or divergence points DIV at which the first to third protrusions P1, P2, and P3 are not formed. More specific details of the support portion Lb will be described below.

In an embodiment, the rim portion L surrounding each of the plurality of battery cells 10 may surround the battery cell 10 while forming an angular closed-loop shape. For example, the rim portion L surrounding each battery cell 10 may surround the battery cell 10 while being bent at each valley or divergence point DIV, and the rim portion L surrounding any one of the plurality of battery cells 10, that is, the first battery cell 13, may surround the first battery cell 13 while extending in the form of an angular closed loop in a shape bent at each valley or divergence point DIV. For example, the rim portion L surrounding the first battery cell 13 may be formed in a shape in which a total of six strips extending in different directions are in contact with each other generally at the respective valleys or divergence points DIV to surround the first battery cell 13. As will be described below, adjacent strips extending in different directions may be in contact with each other in the respective valleys or divergence points DIV along the outer circumferential direction of the first battery cell 13, and as such, in the valleys or divergence points DIV in which the adjacent strips substantially angularly formed and extending in different directions are in contact with each other, the support portions Lb having a rounded end to be fitted into the outer circumferential surface of the first battery cell 13 may be formed from the valleys or the divergence points DIV toward the outer circumferential surface of the first battery cell 13.

In an embodiment, the protrusions P may be formed in the rim portion L surrounding each battery cell 10, and the protrusions P may include the first to third protrusions P1, P2, and P3 protruding from three different positions along the rim portion L surrounding each battery cell 10. Here, each of the first to third protrusions P1, P2, and P3 may be formed at the valley or the divergence point DIV between adjacent battery cells 10 and may induce assembly of three adjacent battery cells 10 while forming interference with the outer peripheral surfaces of the three adjacent battery cells 10.

In more detail, the first to third protrusions P1, P2, and P3 may be respectively formed at three different positions along the rim portion L surrounding any one of the plurality of battery cells 10, that is, the first battery cell 13. The first to third protrusions P1, P2, and P3 may be formed in valleys between the first battery cell 13 and two satellite battery cells 15 adjacent to each other along the outer circumferential direction of the first battery cell 13. In an embodiment, the protrusions P may be formed in three valley alternately positioned with each other, from among a total of six valleys formed between the first battery cell 13 and two satellite battery cells 15 adjacent to each other along the outer circumferential direction of the first battery cell 13, and the support portions Lb for supporting the outer circumferential surfaces of the three adjacent battery cells 10 may be formed in the valleys or the divergence points DIV in which the protrusion P is not formed. For example, the support portions Lb may be formed to protrude from the divergence points DIV at which the rim portion L surrounding each of the three adjacent battery cells 10 all come into contact with each other toward the outer circumferential surface surrounding the three adjacent battery cells 10. In an embodiment, the protrusions P and the support portions Lb may be alternately formed at alternate positions along the rim portion L surrounding the first battery cell 13, and in other words, the protrusions P and the support portions Lb may be alternately formed at alternate positions in the outer circumferential direction of the first battery cell 13. In one embodiment, the protrusions P may be formed at three positions alternate with each other along the rim portion L surrounding the first battery cell 13, and the support portions Lb may be formed at three alternate positions along the rim portion L surrounding the first battery cell 13 at which the protrusion P is not formed. For example, the protrusions P and the support portions Lb may be formed between three battery cells 10 adjacent to each other and may be formed between three different battery cells 10.

The support portions Lb may protrude from the divergence points DIV at which the rim portion L surrounding each of the three adjacent battery cells 10 come into contact with each other toward the outer circumferential surfaces of the three adjacent battery cells 10. In an embodiment, that the support portions Lb protrude from the divergence points DIV toward the outer circumferential surfaces of the three battery cells 10 adjacent to each other may mean that the support portions Lb extend along the rim portion L around the divergence point DIV to widely support the outer circumferential surfaces of the adjacent battery cells 10. For example, the support portions Lb may extend along the rim portion L around the divergence point DIV to widely support the outer circumferential surface of each battery cell 10 and may extend between the protrusions P on both sides arranged along the rim portion L with the support portion Lb therebetween. For example, the support portion Lb may extend along the rim portion L to a length short of the protrusions P on both sides and may be formed between the protrusions P on both sides. Throughout the specification, that the support portions Lb support the outer circumferential surfaces of three adjacent battery cells 10 may mean that the support portions Lb may form physical interference with the outer circumferential surface of at least one battery cell 10 among the three adjacent battery cells 10 and, for example, may include that the support portions Lb are in contact with any one battery cell 10. However, in various embodiments, even when the support portions Lb are not in direct contact with the outer circumferential surface of the battery cell 10 but are arranged with a gap sufficient to be in contact with the outer circumferential surface of the battery cell 10 according to movement of the battery cell 10, the support portions Lb may prevent movement of the battery cell 10, and thus, the support portions Lb may be arranged with a certain gap therebetween without direct contact with the outer circumferential surface of the battery cell 10.

The protrusions P and the support portions Lb may be formed in three positions alternating with each other along the rim portion L and substantially angularly extending so as to surround any one of the plurality of battery cells 10, that is, the first battery cell 13 and, thus, form a rounded curved surface facing the outer circumferential surface of the first battery cell 13. For example, the side surface Pb of the protrusion P and an end of the support portion Lb may provide a rounded curved surface having a concave shape facing the outer circumferential surface of the first battery cell 13. In an embodiment, because the protrusions P and the support portions Lb together form a rounded curved surface facing the outer circumferential surface of the first battery cell 13 along the rim portion L, which generally angularly extends to be more rigid, an assembly position for stably holding the first battery cell 13 while being fitted into the outer circumferential surface of the first battery cell 13 may be provided. In an embodiment, a concavely recessed narrow portion Lc with a relatively narrow width may be formed between the protrusion P and the support portion Lb along the rim portion L surrounding the outer circumferential surface of the first battery cell 13, and the narrow portion Lc of the rim portion L may provide a rounded curved surface facing the outer circumferential surface of the first battery cell 13 between the side surface Pb of the protrusion P and the support portion Lb. In an embodiment, the narrow portion Lc of the rim portion L together with the protrusions P and the support portions Lb along the outer circumferential surface of the first battery cell 13 may cooperate together to form a rounded curved surface continuously connecting the outer circumferential surface of the first battery cell 13, and in such an embodiment, the narrow portions Lc of the rim portion L may be continuously connected to them between the protrusions P and the support portions Lb to provide a rounded curved surface surrounding the outer circumferential surface of the first battery cell 13.

The contact protrusions La protruding toward the outer circumferential surface of the first battery cell 13 may be formed inside the rim portion L surrounding the first battery cell 13. In an embodiment, the contact protrusion La may be formed on the narrow portion Lc recessed with a relatively narrow width along the rim portion L surrounding the first battery cell 13. In an embodiment, the contact protrusions La may be press-fit with the outer circumferential surface of the first battery cell 13, and for example, the contact protrusions La may be in close contact with the outer circumferential surface of the first battery cell 13 to firmly fix the position of the first battery cell 13. In an embodiment, the contact protrusions La may be in close contact with the outer circumferential surface of the first battery cell 13 such that the contact protrusions La are deformed while being involved in assembly of the first battery cell 13 and may form press-fitting with the outer circumferential surface of the first battery cell 13.

The contact protrusion La may be in close contact with the outer circumferential surface of the first battery cell 13 while being deformed while being assembled with the first battery cell 13. For example, the contact protrusions La may be pushed in the opposite direction to the first battery cell 13 and deformed while being in close contact with the outer circumferential surface of the first battery cell 13, according to physical friction or interference with the first battery cell 13 being assembled in the height direction Z3. In an embodiment, the contact protrusions La may be formed to protrude inwardly toward the center of the first battery cell 13 from among the rounded curved surfaces continuously surrounding the outer circumferential surface of the first battery cell 13 and, thus, may be forced to be in contact with the outer circumferential surface of the first battery cell 13. In an embodiment, the rounded curved surface continuously surrounding the outer circumferential surface of the first battery cell 13 may directly face the outer circumferential surface of the first battery cell 13, for example, may include the side surface Pb of the protrusion P and the support portion Lb and may include the narrow portion Lc of the rim portion L formed between the side surface Pb and the support portion Lb of the protrusion P. In addition, the contact protrusion La protruding from the narrow portion Lc of the rim portion L toward the outer circumferential surface of the first battery cell 13 may form a structure protruding toward inwardly toward the center of the first battery cell 13 in the rounded curved surface continuously surrounding the outer circumferential surface of the first battery cell 13.

The contact protrusion La may protrude to a certain length from the narrow portion Lc recessed with a relatively narrow width along the rim portion L surrounding the first battery cell 13 and may protrude to the certain length from the narrow portion Lc recessed with a relatively narrow width along the rim portion L surrounding the first battery cell 13 toward the outer circumferential surface of the first battery cell 13. Thus, the position of the contact protrusion La may be appropriately designed to allow assembly of the first battery cell 13 and to form sufficient press-fitting with the outer circumferential surface of the first battery cell 13. For example, the contact protrusion La may be formed to protrude from the concavely recessed narrow portion Lc toward the first battery cell 13 such that an appropriate length is maintained considering a process of forming the contact protrusion La while excessive protrusion of the contact protrusion La does not interfere with assembly of the first battery cell 13.

The contact protrusions La may be formed at symmetrical positions along the rim portion L surrounding the first battery cell 13 and may hold (or maintain) the position of the first battery cell 13 while forming press-fitting with the first battery cell 13 at the symmetrical positions. For example, the contact protrusions La may be formed between the protrusions P and the support portions Lb formed at three positions alternating with each other along the rim portion L surrounding the first battery cell 13 and may be formed in a total of six symmetrical positions along the rim portion L. In an embodiment, a total of six narrow portions Lc and a total of six contact protrusions La may formed at positions between the protrusions P and the support portions Lb along the rim portion L surrounding the first battery cell 13.

Hereinafter, the positional relationship between the battery cell 10 and the lower holder W2 in which the contact protrusions La are formed to form press-fitting with the battery cell 10, more particularly, the height relationship between the battery cell 10 and the lower holder W2 in the height direction Z3 following the assembly direction of the battery cell 10, in the battery pack 1 according to an embodiment, will be described with reference to FIG. 16. In an embodiment, in the lower holder W2, the rim portions L formed to respectively surround a plurality of battery cells 10 may be connected to each other in a net shape and form the main surface W2*m* of the lower holder W2. The main surface W2*m* of the lower holder W2 may correspond to a surface occupying the largest area in the lower holder W2 and may include the main surface W2*m* facing the upper holder W1 and the main surface W2*m* opposite to the upper holder W1. In an embodiment, the lower holder W2 may include the main surface W2*m* in which the rim portions L respectively surrounding the battery cells 10 are connected to each other in a net shape and may have an upper main surface S1 and a lower main surface S2 constituting opposite main surfaces W2*m* in the height direction Z3. The upper main surface S1 faces the upper holder W1, and the lower main surface S2 is opposite to the upper holder W1.

In an embodiment, the battery cell 10 assembled to the lower holder W2 may have an upper end and a lower end in the height direction Z3, and the lower end of the battery cell 10 may be arranged at a level lower than the main surface W2m of the lower holder W2, that is, the lower main surface S2 of the lower holder W2. The battery cell 10 may, for example, protrude from (e.g., may protrude below) the lower main surface S2 of the lower holder W2 to a settling depth t (e.g., a preset settling depth t). Throughout the specification, when referring to the main surface W2m of the lower holder W2 in relation to the settling depth t of the battery cell 10 or the lower end of the battery cell 10, the main surface W2m of the lower holder W2 may refer to the lower main surface S2 from among the main surfaces W2m of the lower holder W2. On the contrary, throughout the specification, when referring to the main surface W2m of the lower holder W2 in relation to protrusion of the first to third protrusions P1, P2, and P3, the main surface W2m of the lower holder W2 may refer to the upper main surface S1 from among the main surfaces W2m of the lower holder W2.

In an embodiment, the lower end of the battery cell 10 may protrude downwardly from the main surface W2m of the lower holder W2 by the settling depth t, and the lower end of the battery cell 10 may protrude downwardly from the main surface W2m of the lower holder W2 by the settling depth t to be arranged at a level lower than the main surface W2m. In an embodiment, when the position of the battery cell 10 is fixed, the settling depth t of the lower end of the battery cell 10 may be in a range of about 1/10 mm to about 1 mm from the main surface W2m of the lower holder W2. Here, the range of about 1/10 mm to about 1 mm is used in a broad sense encompassing all depths corresponding to one digit less than or equal to decimal point to a scale corresponding to one digit more than or equal to decimal point. In one embodiment, the settling depth t of the battery cell 10 may be a depth of 0.5 mm or greater from the main surface W2m of the lower holder W2.

In an embodiment, the first to third protrusions P1, P2, and P3 (e.g., the side surface Pb of the first to third protrusions P1, P2, and P3) inducing assembly of the battery cell 10 toward the lower holder W2 may induce the battery cell 10 being assembled between the first to third protrusions P1, P2, and P3 to the correct position, while forming the circular traces OC and IC having the diameters DO and DI gradually reduced from the first circular trace OC to the second circular trace IC in a direction opposite to the assembly direction of the battery cell 10 in the height direction Z3. In addition, the contact protrusions La forming press-fitting with the battery cell 10 are formed on the rim portion L forming the common support base of the first to third protrusions P1, P2, and P3, the contact protrusions La are arranged at a lower level than the first to third protrusions P1, P2, and P3 formed on the rim portion L, for example, at a low level adjacent to the main surface W2m formed by the rim portion. Thus, the settling depth t at which the position of the battery cell 10 is fixed while forming press-fitting with the contact protrusion La, that is, the depth of the lower end of the battery cell 10 when the position of the battery cell 10 is fixed, may be formed, for example, at a lower height than the main surface W2m formed by the rim portion L, and accordingly, sufficient press-fitting may occur between the battery cell 10 and the contact protrusions La formed on the rim portion L. Throughout the specification, the settling depth t or the height of the lower end of the battery cell 10 all refer to the depth or height from the main surface W2m of the lower holder W2 in the height direction Z3 and may be referred to as a depth or a height in the relevant descriptions but may also refer to a depth or a height from the main surface W2m of the lower holder W2 in the height direction Z3.

In an embodiment, the settling depth t of the battery cell 10 is formed at a height lower than the height of the rim portion L in which the contact protrusions La that form press-fitting with the battery cell 10 are formed, or the height of the main surface W2m formed by the rim portion L, and the lower end of the battery cell 10 may protrude downwardly from the rim portion L or the main surface W2m formed by the rim portion L, and may protrude from the rim portion L or the main surface W2m formed by the rim portion L by the settling depth t.

In an embodiment, the settling depth t of the battery cell 10 (e.g., the depth of the lower end of the battery cell 10 when the position of the battery cell 10 is fixed) may be formed at a height lower than the rim portion L in which the contact protrusions La forming press-fitting with the battery cell 10 are formed, and thus, firm position fixation of the battery cell 10 may be secured. For example, because the lower end of the battery cell 10 is arranged with the settling depth t at a lower level than at least the rim portion L on which the contact protrusions La are formed, firm position fixation of the battery cell 10 may be secured through physical interference or press-fitting between the battery cell 10 and the contact protrusions La, and firm position fixation of the battery cell 10 may be secured through sufficient interference between the battery cell 10 and the contact protrusions La in the assembly direction of the battery cell 10. Here, the settling depth t by which the lower end of the battery cell 10 protrudes downwardly from the rim portion L may correspond to a preset assembly tolerance or allowance for securing physical interference or press-fitting between the battery cell 10 and the contact protrusions La.

Referring to FIG. 1, in an embodiment, an electrical connection of the battery cells 10 may be formed through the upper end of the battery cell 10 and cooling of the battery cell 10 may be implemented through the lower end of the battery cell 10. For example, in an embodiment, electrical connections, such as parallel or series connections, between a plurality of battery cells 10 may be formed through the electrodes 11 and 12 formed on the upper ends of the battery cells 10 and the busbars B on the upper ends of the battery cells 10, and cooling of the battery cells 10 may be implemented through the lower ends of the battery cells 10, that is, through the lower ends of the battery cells 10 exposed at the settling depth t from the lower holder W2. In an embodiment, a plurality of busbars B forming electrical connections between the plurality of battery cells 10 may be arranged on the upper holder W1 into which the upper ends of the battery cells 10 are fitted, and the cooling plate 70 (see, e.g., FIG. 1) forming thermal contacts with the plurality of battery cells 10 may be arranged on the lower holder W2 into which the lower ends of the battery cells 10 are fitted. For example, the busbars B may be arranged on the upper holder W1 to form electrical connections with the upper ends of the battery cells 10 (e.g., the electrodes 11 and 12 formed on the upper ends of the battery cells 10), and the cooling plate 70 may be arranged under the lower holder W2 to form thermal contacts with the lower ends of the battery cells 10 (e.g., the lower ends of the battery cells 10 exposed from the lower holder W2 at the settling depth t). Here, that the cooling plate 70 and the lower ends of the battery cells 10 form thermal contacts may include that the cooling plate 70 and the lower ends of the battery cells 10 are in direct contact with each other or, for example, may be used in a broad sense including a configuration in which the cooling plate 70 and the lower ends of the battery cells 10 are arranged adjacent to each other to the extent that heat transfer is possible therebetween although they are not in direct contact with each other. In an embodiment, because electrical connections of the battery cells 10 and cooling of the battery cells 10 are implemented through the upper ends and the lower ends of the battery cells 10 spaced apart from each other in the height direction Z3, respectively, the electrical connections of the battery cells 10 and the cooling of the battery cells 10 may be smoothly implemented with each other, for example, at positions where the electrical connections and cooling of the battery cells 10 do not interfere with each other. For example, if the electrical connections of the battery cells 10 were made through both the upper ends and the lower ends of the battery cells 10, different from the described embodiments, the overall structure of the battery pack 1 may be complicated because both a cooling structure and electrical connections would be necessary at the lower ends of the battery cells 10, and in particular, a separate insulation structure for insulation between electrical connection and cooling is required at the lower ends of the battery cells 10.

Figure 17:
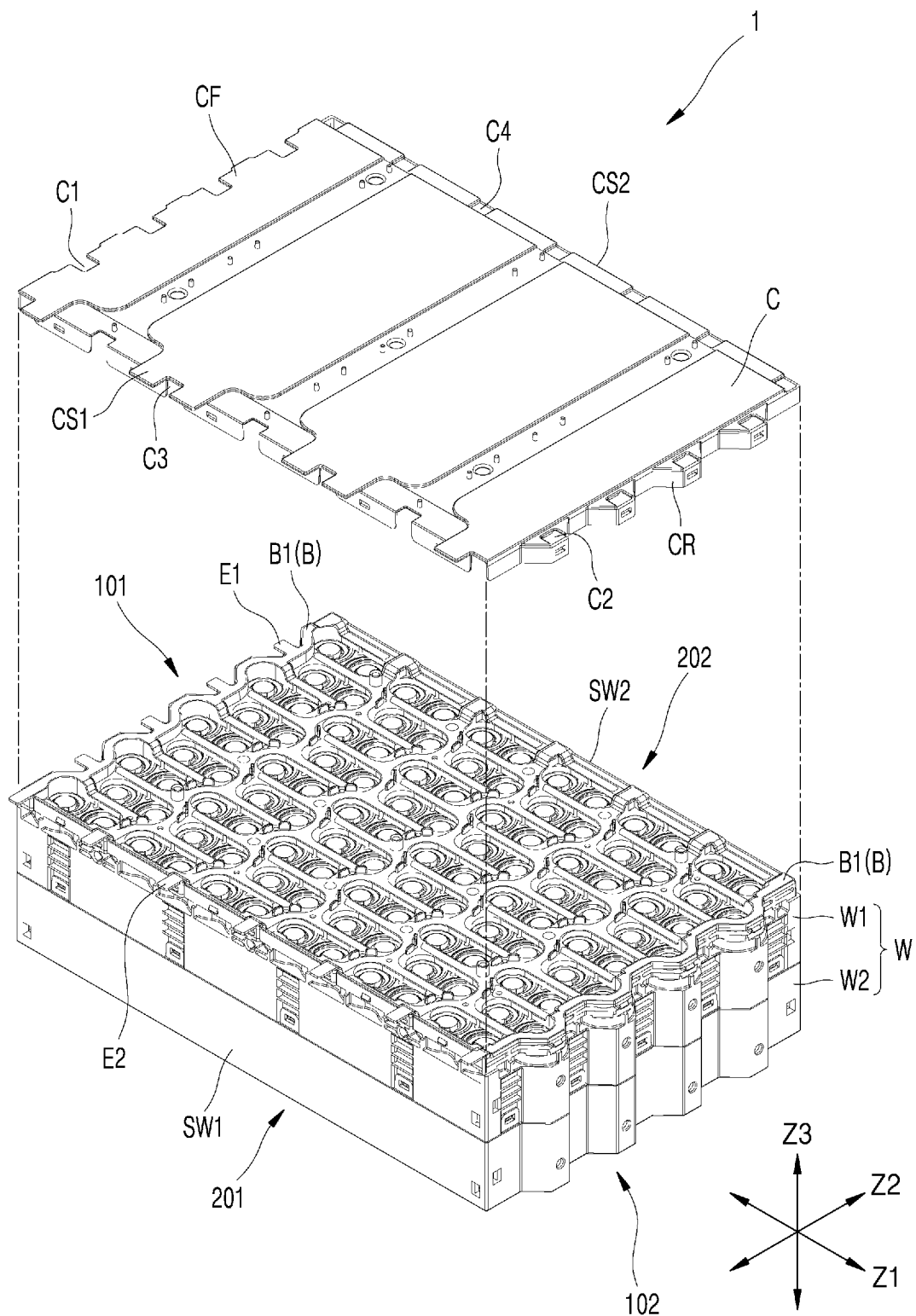
FIG. 17 is an exploded perspective view of a battery pack according to an embodiment.
Figure 18:
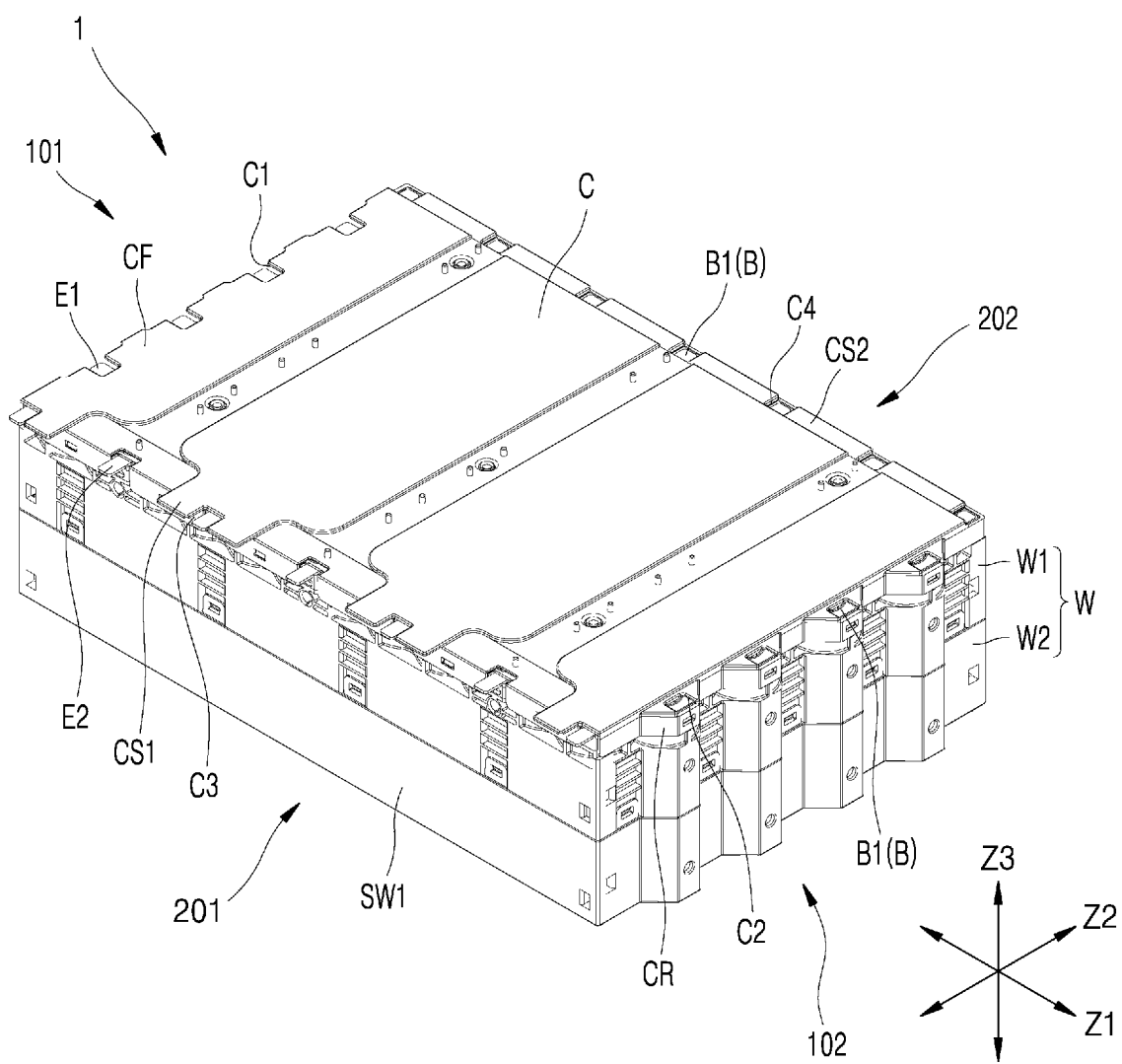
FIG. 18 is a perspective view of the battery pack illustrated in FIG. 17 in an assembled state.

FIG. 17 is an exploded perspective view of a battery pack according to an embodiment. FIG. 18 is a perspective view illustrating the battery pack in a state in which the cover of FIG. 17 is assembled.

Referring to FIGS. 17 and 18, in an embodiment, the cover C may be arranged on the cell holder W. The cover C may have a front edge CF and a rear edge CR arranged to face each other in the row direction Z1 and a first side edge CS1 and the second side edge CS2 arranged to face each other in the column direction Z2. To form the module 100 expanded in the row direction Z1, in the front edge CF and the rear edge CR, openings C1 and C2 for exposing the first expansion pieces E1 extending from the body portion B1 of the foremost busbar B and a portion of the body portion B1 of the rearmost busbar B may be formed. For example, the front openings C1 for exposing the first expansion pieces E1 extending from the body portion B1 of the foremost busbar B may be formed in the front edge portion CF, and the rear openings C2 for exposing a portion of the body portion B1 of the rearmost busbar B may be formed in the rear edge CR. In the expanded module 100 including a plurality of battery packs 1 arranged in the row direction Z1, the first expansion pieces E1 are exposed through the front openings C1 of one battery pack 1 and the body portion B1 of the busbar B are exposed through the rear openings C2 of a battery pack 1 adjacent to the one battery pack 1 in the row direction Z1 to overlap each other, the foremost busbar B and the rearmost busbar B of the battery packs 1 adjacent to each other in the row direction Z1 may be electrically connected to each other. By coupling the first expansion pieces E1 and the body portion B1 of the busbar B exposed from the front edge CF and the rear edge CR of the cover C to each other by welding or the like, electrical connections between the adjacent battery packs 1 may be easily formed. For example, in an embodiment, the battery packs 1 arranged adjacent to each other in the row direction Z1 may have substantially the same structure, and by arranging the battery packs 1 having the same structure in the row direction Z1, the expanded module 100 including a plurality of battery packs 1 in the row direction Z1 may be provided. To this end, in the battery packs 1 according to an embodiment, the front openings C1 formed in the front edge CF of the cover C and the rear openings C2 formed in the rear edge CR of the cover C may be formed at row positions corresponding to each other, and the front openings C1 and the rear openings C2 may be formed at positions facing each other in the row direction Z1 such that the first expansion pieces E1 extending from the foremost busbar B exposed through the front openings C1 and the rearmost busbar B exposed through the rear openings C2 may be coupled to each other at positions corresponding to each other in the row direction Z1.

Similarly, to form the module 100 expanded in the column direction Z2, in the first and second side edges CS1 and CS2 of the cover C, openings C3 and C4 for exposing the second expansion pieces E2 extending from the outermost positions of one side of the body portions B1 of the busbars B in the column direction Z2, and the outermost portions of the other side of the body portions B1 of the busbars B may be formed. In an embodiment, the first side openings C3 for exposing the second expansion pieces E2 extending from the outermost positions of one side of the body portions B1 of the busbars B in the column direction Z2 may be formed in the first side edge CS1, and the second side openings C4 for exposing the outermost positions of the other side of the body portions B1 of the busbars B may be formed in the second side edge CS2 in the column direction Z2. In the expanded module 100 including a plurality of battery packs 1 in the column direction Z2, the second expansion pieces E2 exposed through the first side openings C3 of one battery pack 1, and the body portions B1 of the busbars B exposed through the second side openings C4 of a battery pack 1 adjacent to the one battery pack 1 in the column direction Z2 may overlap each other, and thus, the busbars B of the battery packs 1 adjacent to each other in the column direction Z2 may be electrically connected to each other. By coupling the second expansion pieces E2 and the busbars B (the outermost positions of the busbars B in the column direction Z2) exposed from the first and second side portions CS3 and CS4 of the cover C, to each other by welding or the like, electrical connections between the adjacent battery packs 1 may be easily formed. For example, in an embodiment, the battery packs 1 arranged adjacent to each other in the column direction Z2 may have substantially the same structure, and by arranging the battery packs 1 having the same structure in the column direction Z2, the expanded module 100 including a plurality of battery packs 1 in the column direction Z2 may be provided. To this end, in the battery packs 1 according to an embodiment, the first and second side openings C3 and C4 formed in the first and second side edges CS1 and CS2 of the cover C may be formed at column positions corresponding to each other, the first and second side openings C3 and C4 may be formed at positions facing each other in the column direction Z2; thus, the second expansion pieces E2 exposed through the first side openings C3 and the busbars B (the outermost positions of the busbars B in the column direction Z2) exposed through the second side openings C4 may be formed at positions corresponding to each other, and the first and second side openings C3 and C4 may be formed at positions facing each other in the column direction Z2, and thus, the second expansion pieces E2 exposed through the first side openings C3 and the busbars B (the outermost positions of the busbars B in the column direction Z2) exposed through the second side openings C4 may be coupled to each other at positions corresponding to each other in the column direction Z2.

In an embodiment, the openings C1, C2, C3, and C4 may have a notch shape or a hole shape. For example, the front openings C1 and the first side openings C3 for exposing the first and second expansion pieces E1 and E2 may be formed in a notch shape, and the front edge CF and the first side edge CS1 around the first and second expansion pieces E1 and E2 may surround the first and second expansion pieces E1 and E2 in an open-loop shape having one side open to protect the first and second expansion pieces E1 and E2 from an external environment. In an embodiment, the rear openings C2 and the second side opening C4 for exposing a portion of the busbars B in the row direction Z1 and the column direction Z2 may be formed in a hole shape, and the rear edge CR and the second side edge CS2 around the busbars B exposed to the outside may surround the portion of the busbars B in a closed-loop shape to protect the portion of the busbars B exposed to the outside from an external environment.

Figure 19:
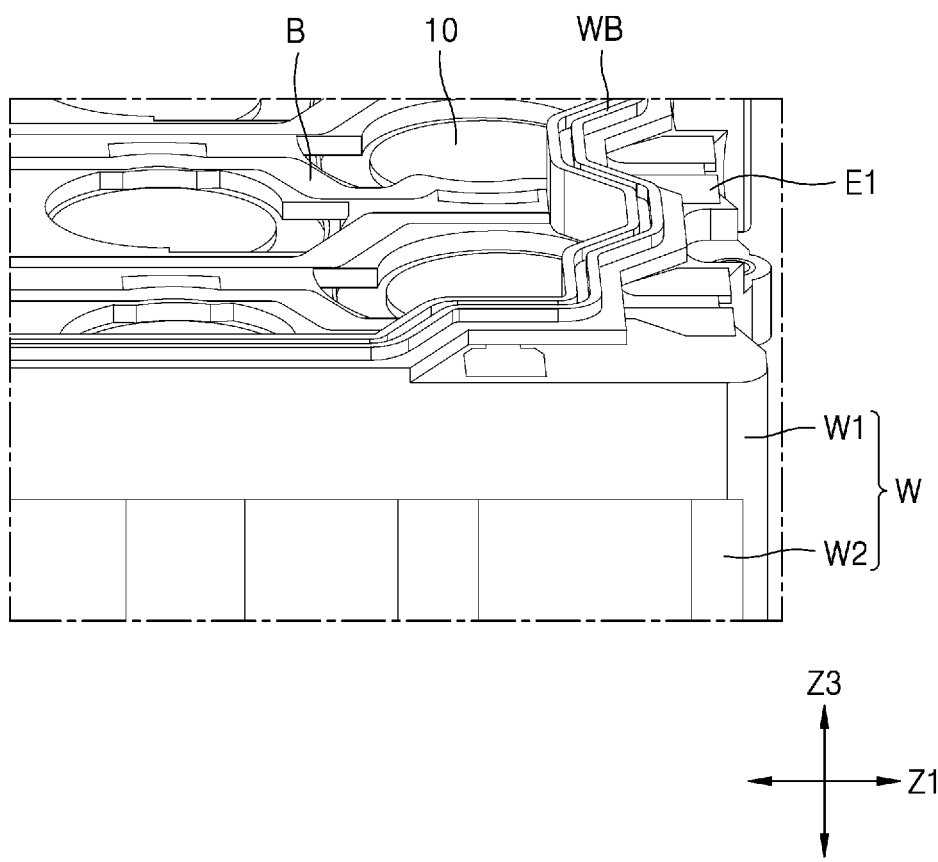
FIG. 19 is a perspective view illustrating a cell holder of a battery pack according to another embodiment.
Figure 20:
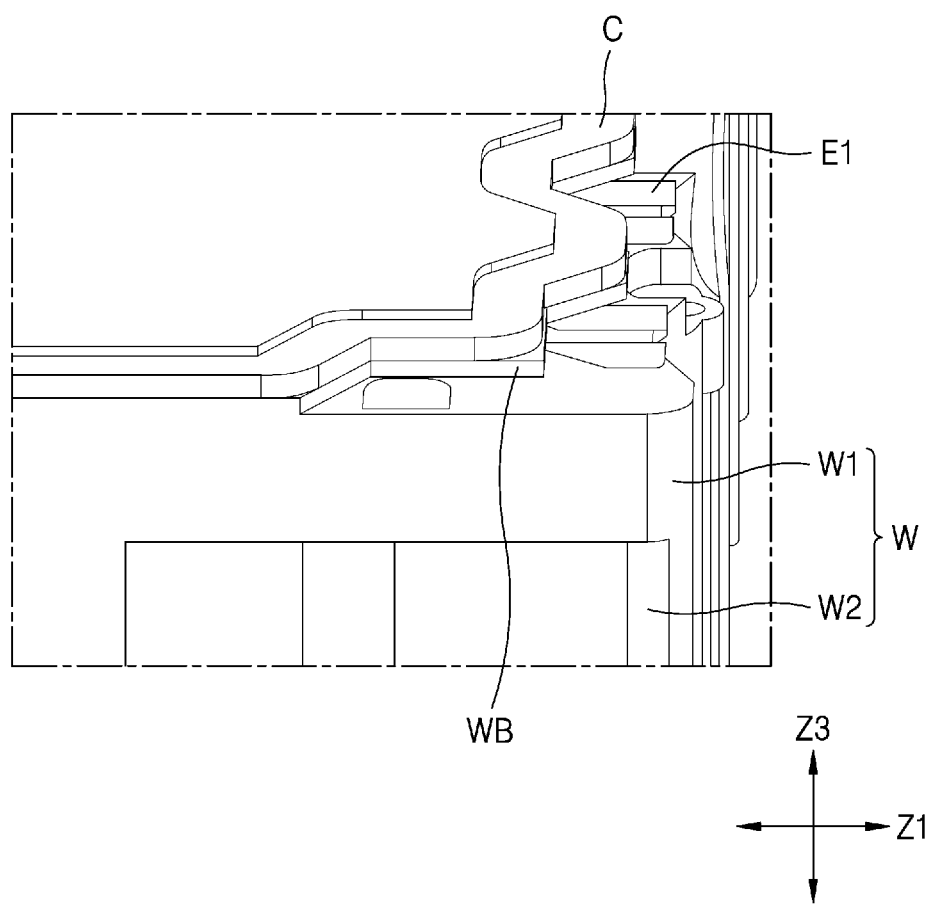
FIG. 20 is a perspective view illustrating a state in which a cover is assembled on the cell holder illustrated in FIG. 19.

FIG. 19 is a perspective view illustrating a cell holder of a battery pack according to another embodiment. FIG. 20 is a perspective view illustrating a state in which a cover is assembled on the cell holder illustrated in FIG. 19.

Referring to FIGS. 19 and 20 together, the cell holder W may include a weld bead portion WB for welding with the cover C. For example, in an embodiment, the weld bead portion WB may be formed at a position of the cell holder W in contact with the cover C. The busbars B may be arranged on the cell holder W together with the cover C, the cell holder W and the cover C facing each other in the height direction Z3 and forming coupling to each other may be formed at positions in direct contact with each other, and the cell holder W may be in direct contact with the cover C through the weld bead portion WB.

The weld bead portion WB forms a coupling portion while directly contacting the cover C, and in more detail, the weld bead portion WB may form a coupling portion between the cell holder W and the cover C. In an embodiment, the weld bead portion WB forms a coupling portion with the cover C while directly contacting the cover C and may be formed at a level most adjacent to the cover C from among the cell holder W, that is, at a level closest to the side of the cover C in the height direction Z3. As will be described below, the weld bead portion WB may be formed at a level higher than the busbars B supported on the cell holder W, or the expansion pieces E1 extending from the busbar B and may extend across the expansion pieces E1 extending to the outside of the accommodation space in which the busbars B are accommodated.

In an embodiment, the weld bead portion WB may surround (or may extend around) the accommodation space of the cell holder W in a closed-loop shape along the periphery of the cell holder W and may surround the accommodation space of the cell holder W to seal the battery cells 10 and the busbars B arranged in the accommodation space of the cell holder W from an external environment. In an embodiment, the weld bead portion WB may extend across the expansion pieces E1 extending from the busbar B in the row direction Z1 and the column direction Z2 while surrounding the busbars B arranged in the accommodation space. Throughout the specification, that the weld bead portion WB extends across the expansion pieces E1 extending from the body portion B1 of the busbar B may mean that the weld bead portion WB extends across the expansion pieces E1 at a higher level than the expansion pieces E1, and the weld bead portion WB may extend across the expansion pieces E1 at a level higher than the expansion pieces E1 in the height direction Z3, and thus, may extend across the expansion pieces E1 at a level higher than at least the expansion pieces E1, that is, at a level closer to the cover C than to the expansion pieces E1 in the height direction Z3. The weld bead portion WB may form a coupling portion with the cover C while directly contacting the cover C at a height closer to the cover C than to the expansion pieces E1.

In an embodiment, the weld bead portion WB may form a coupling point between the cell holder W and the cover C by welding, and in more detail, may form the coupling point through laser welding. In an embodiment, the cell holder W and the cover C may be formed of, for example, a polymer resin material, such as engineering plastic, to form a coupling portion therebetween through laser welding, may be formed of a material with excellent material affinity, and in an embodiment, may be formed of the same polymer resin material to which laser welding is applicable.

Throughout the specification, that the weld bead portion WB extends across the expansion pieces E1 may mean that that the weld bead portion WB extends across the expansion pieces E1 extending from the busbar B to the outside of the accommodation space while surrounding the accommodation space in which the busbar B is accommodated. In various embodiments, the objects surrounded by the weld bead portion WB is not limited to the expansion piece E1 extending from the bus bar B and, for example, may collectively include a portion of the busbar B from which the expansion pieces E1 extends, or a portion through which the expansion pieces E1 and the busbar B are connected to each other, and the like. For example, according to alignment of positions of or an assembly tolerance between the cell holder W in which the weld bead portion WB is formed and the busbar B, the weld bead portion WB may extend across a portion of the busbar B from which the expansion pieces E1 extends, or may extend across a portion through which the expansion pieces E1 and the busbar B are connected to each other rather than extending across the expansion pieces E1. Even in such an embodiment, the weld bead portion WB may surround the accommodation space in which the busbars B and the battery cells 10 are accommodated while extending across a portion of the busbar B to which the expansion pieces E1 are connected or the portion through which the expansion pieces E1 and the busbar B are connected to each other.

Although the disclosure has been described with reference to embodiments illustrated in the accompanying drawings, the described embodiments are merely examples, and those of skill in the art to which the present disclosure pertains would understand that various modifications and equivalent other embodiments may be derived therefrom.

According to the present disclosure, a module having various outputs and capacities may be provided in such a manner that a plurality of battery packs, each of which is one unit having the same structure, are connected to each other, and by varying the number of battery packs included in a module, the battery pack may be easily configured to provide various outputs and capacities by using battery packs having the same structure.

According to the present disclosure, a battery pack having an improved structure may be provided such that various temperature detection positions may be naturally set for a module expanded to include a plurality of battery packs, including the central position of the entire module, through temperature detection positions set in each battery pack without requiring separately setting temperature detection positions in the expanded module.

It should be understood that the embodiments described herein should be considered in a descriptive sense and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims and their equivalents.

What is claimed is:

1. A battery pack comprising:
   a plurality of battery cells arranged in a plurality of rows in a row direction, the rows of battery cells being adjacent to each other in a column direction crossing the row direction, adjacent ones of the rows of battery cells being alternately shifted to front positions or rear positions in the row direction;
   busbars electrically connecting the plurality of battery cells to each other, arranged to form a parallel group by connecting a group of adjacent ones of the battery cells to each other in parallel, and connecting adjacent ones of the parallel groups adjacent to each other in series, each of the busbars comprising a body portion extending between parallel groups adjacent to each other and in a zigzag shape in the column direction and a first branch portion and a second branch portion, both of the first and second branch portions extending in the row direction from the body portion toward different adjacent parallel groups, respectively; and
   expansion pieces protruding from the body portion of the busbar to external positions outside the plurality of battery cells in the row direction or the column direction.

2. The battery pack of claim 1, wherein the first and second branch portions extend parallel to each other from positions alternating with each other in the body portion of the busbar in the row directions opposite to each other.

3. The battery pack of claim 2, wherein the first and second branch portions extend parallel to each other in the row direction at positions alternating with each other in the column direction to be fitted into each other in each of the parallel groups.

4. The battery pack of claim 3, wherein the first and second branch portions are fitted into each other while protruding toward respective parallel groups from the body portions of the different busbars arranged on both sides of each of the parallel groups.

5. The battery pack of claim 1, wherein the expansion pieces comprise first expansion pieces protruding in the row direction from the body portion of an outermost busbar in the row direction.

6. The battery pack of claim 5, wherein the body portion of any one of a foremost busbar and a rearmost busbar, which face each other in the row direction, forms a first expansion edge in which the first expansion pieces are formed, and
   wherein the body portion of the other busbar forms a first accommodation edge that accommodates the first expansion pieces.

7. The battery pack of claim 6, wherein the body portion of the busbar that forms the first expansion edge has concave portions in which the first expansion pieces are formed,
   wherein the body portion of the busbar that forms the first accommodation edge has convex portions that accommodate the first expansion pieces, and
   wherein the concave portions in which the first expansion pieces are formed and the convex portions that accommodate the first expansion pieces are formed at positions facing each other in the row direction.

8. The battery pack of claim 7, wherein the body portion of the busbar that forms the first expansion edge has convex portions alternately arranged with the concave portions and extends in a first zigzag shape, and
   wherein the body portion of the busbar that forms the first accommodation edge has concave portions alternately arranged with the convex portions and extends in a second zigzag shape.

9. The battery pack of claim 8, wherein the first and second zigzag shapes are complementary shapes such that the concave portions and the convex portions of the body portion of the busbar that forms the first expansion edge and the convex portions and the concave portions of the body portion of the busbar that forms the first accommodation edge face each other in the row direction, respectively.

10. The battery pack of claim 5, further comprising a cell holder having front walls and rear walls facing each other in the row direction to accommodate the plurality of battery cells,
    wherein any one of the front walls and the rear walls form a first expansion edge together with the body portion of the busbar in which the first expansion pieces are formed, and
    wherein the other one of the front walls and the rear walls form a first accommodation edge together with the body portion of the busbar that accommodates the first expansion pieces.

11. The battery pack of claim 10, wherein the walls that form the first expansion edge extend in a first zigzag shape by following the body portion of the busbar that forms the first expansion edge, and
    wherein the walls that form the first accommodation edge extend in a second zigzag shape by following the body portion of the busbar that forms the first accommodation edge.

12. The battery pack of claim 11, wherein the first and second zigzag shapes are formed in complementary shapes such that the concave portions and the convex portions of the walls that form the first expansion edge and the convex portions and the concave portions of the wall that form the first accommodation edge face each other, respectively, in the row direction.

13. The battery pack of claim 1, wherein the expansion pieces comprise second expansion pieces protruding in the column direction from outermost positions of the body portions of the busbars in the column direction.

14. The battery pack of claim 13, wherein, from among positions of one end and another end of the body portions of the busbars in the column direction, outermost positions of any one end form a second expansion edge in which the second expansion pieces are formed, and
    wherein outermost positions of the other end form a second accommodation edge that accommodates the second expansion pieces.

15. The battery pack of claim 14, further comprising a cell holder having a first sidewall and a second sidewall facing each other in the column direction to accommodate the plurality of battery cells,
    wherein any one sidewall of the first sidewall and the second sidewall forms the second expansion edge together with the outermost positions of the body portions of the busbars in which the second expansion pieces are formed, and
    wherein the other one sidewall of the first sidewall and the second sidewall forms the second accommodation edge together with the outermost positions of the body portions of the busbars that accommodate the second expansion pieces.

16. The battery pack of claim 15, wherein the sidewall that forms the second expansion edge and the sidewall that forms the second accommodation edge are flat and contact each other.

17. The battery pack of claim 1, further comprising:
a cell holder extending around an accommodation space for the plurality of battery cells, the cell holder has a hollow protrusion formed at a temperature detection position;
a cover arranged on the cell holder and having an exposure hole for exposing the hollow protrusion; and
a thermistor accommodated in the hollow protrusion through the exposure hole for measuring a temperature of the battery cells.

18. The battery pack of claim 17, wherein the temperature detection position comprises:
a first temperature detection position at a central position of the cell holder; and
a second temperature detection position nearer to a corner position of the cell holder than to a central position of the cell holder is.

19. The battery pack of claim 18, wherein the second temperature detection position comprises four second temperature detection positions formed adjacent to four corner positions at where a second expansion edge and a second accommodation edge facing each other in the row direction and a first expansion edge and a first accommodation edge facing each other in the column direction contact each other.

20. The battery pack of claim 19, wherein the second temperature detection positions are at positions between the first expansion edge and the first accommodation edge and are positionally biased toward the first accommodation edge.

\* \* \* \* \*